(12) United States Patent
Kanitz

(10) Patent No.: US 11,420,650 B2
(45) Date of Patent: Aug. 23, 2022

(54) SYSTEMS AND METHODS FOR DICTATING ROUTES FOR BI-DIRECTIONAL VEHICLES

(71) Applicant: UATC, LLC, San Francisco, CA (US)

(72) Inventor: Daniel Adam Kanitz, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 175 days.

(21) Appl. No.: 16/923,624

(22) Filed: Jul. 8, 2020

(65) Prior Publication Data
US 2021/0380135 A1 Dec. 9, 2021

Related U.S. Application Data

(60) Provisional application No. 63/034,427, filed on Jun. 4, 2020.

(51) Int. Cl.
| | |
|---|---|
| *B60W 60/00* | (2020.01) |
| *B60W 40/08* | (2012.01) |
| *G06Q 10/02* | (2012.01) |
| *G01C 21/34* | (2006.01) |
| *B62D 47/00* | (2006.01) |
| *G05D 1/02* | (2020.01) |

(52) U.S. Cl.
CPC ........ *B60W 60/0013* (2020.02); *B60W 40/08* (2013.01); *B60W 60/00253* (2020.02); *B62D 47/00* (2013.01); *G01C 21/3407* (2013.01); *G05D 1/0214* (2013.01); *G06Q 10/02* (2013.01); *B60W 2040/0881* (2013.01); *B60W 2520/10* (2013.01); *B60W 2540/221* (2020.02); *B60W 2540/223* (2020.02); *B60W 2540/227* (2020.02); *B60W 2555/40* (2020.02)

(58) Field of Classification Search
None
See application file for complete search history.

*Primary Examiner* — Peter D Nolan
*Assistant Examiner* — Mikko Okechukwu Obioha
(74) *Attorney, Agent, or Firm* — Dority & Manning, P.A.

(57) ABSTRACT

Systems and methods for dictating motion for bi-directional vehicles is provided. The method includes obtaining passenger and map data. The passenger data identifies an orientation of a passenger and the map data identifies route attributes for one or more route segments. The method includes determining one or more motion constraints for a bi-directional vehicle and map constraints for a routing the bi-directional vehicle based on the passenger data and the map data. The motion constraints can identify a vehicle orientation with which the bi-directional vehicle can travel. The map constraints can identify one or more route segments restricted from travel by the bi-directional vehicle. The method includes generating a constrained route based on the motion and map constraint(s). The constrained route can include permitted route segments and movements for the bi-directional vehicle. The method can include initiating the motion of the bi-directional vehicle based on the constrained route.

20 Claims, 12 Drawing Sheets

SYSTEMS AND METHODS FOR DICTATING ROUTES FOR BI-DIRECTIONAL VEHICLES

RELATED APPLICATION

The present application is based on and claims benefit of U.S. Provisional Patent Application No. 63/034,427 having a filing date of Jun. 4, 2020, which is incorporated by reference herein.

FIELD

The present disclosure relates generally to autonomous vehicles and, more particularly, motion constraints for autonomous vehicles.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given such knowledge, an autonomous vehicle can navigate through the environment.

SUMMARY

Aspects and advantages of embodiments of the present disclosure will be set forth in part in the following description, or may be learned from the description, or may be learned through practice of the embodiments.

An example aspect of the present disclosure is directed to another computer-implemented method. The method can include obtaining, by a computing system comprising one or more computing devices, passenger data for at least one passenger of a bidirectional autonomous vehicle. The passenger data can be indicative of a passenger orientation associated with the at least one passenger. The method can include obtaining, by the computing system, map data indicative of one or more route attributes for one or more of a plurality of route segments. The one or more route attributes can include one or more passenger orientation restrictions for the at least one passenger. The method can include determining, by the computing system, one or more map constraints based, at least in part, on the passenger data and the map data. The one or more map constraints can be indicative of one or more restricted route segments of the plurality of route segments. The one or more restricted route segments can be associated with at least one passenger orientation restriction. The method can include generating, by the computing system, a constrained route based, at least in part, on the one or more map constraints. The constrained route can include one or more unrestricted route segments different than the restricted route segments.

Another example aspect of the present disclosure is directed to a computing system. The computing system can include one or more processors and one or more non-transitory computer-readable media that collectively store instructions that, when executed by the one or more processors, cause the system to perform operations. The operations can include obtaining a request for a transportation service to transport at least one passenger from an origin location to a destination location. The operations can include obtaining passenger data for the at least one passenger. The passenger data can be indicative of a passenger orientation associated with the at least one passenger. The operations can include obtaining map data indicative of one or more route attributes for one or more of a plurality of route segments. The one or more route attributes can include one or more passenger orientation restrictions for the at least one passenger. The operations can include determining one or more map constraints based, at least in part, on the passenger data and the map data. The one or more map constraints can be indicative of one or more restricted route segments of the plurality of route segments. The one or more restricted route segments are associated with at least one passenger orientation restriction. And, the operations can include generating a constrained route from the origin location to the destination location based, at least in part, on the one or more map constraints.

Yet another example aspect of the present disclosure is directed to a bidirectional vehicle. The bidirectional vehicle includes a vehicle computing system with one or more processors and one or more non-transitory computer-readable media that collectively store instructions that, when executed by the one or more processors, cause the system to perform operations. The operations include obtaining passenger data for at least one passenger of the bidirectional autonomous vehicle. The passenger data can be indicative of a passenger orientation associated with the at least one passenger. The operations include obtaining map data indicative of one or more route attributes for one or more of a plurality of route segments. The one or more route attributes comprise one or more passenger orientation restrictions for the at least one passenger. The operations include determining one or more map constraints based, at least in part, on the passenger data and the map data. The one or more map constraints can be indicative of one or more restricted route segments of the plurality of route segments. The one or more restricted route segments can be associated with at least one passenger orientation restriction. And, the operations can include initiating a constrained motion plan for the autonomous vehicle based, at least in part, on the one or more motion constraints. The constrained route can include one or more unrestricted route segments different than the restricted route segments.

Other example aspects of the present disclosure are directed to other systems, methods, vehicles, apparatuses, tangible non-transitory computer-readable media, and the like for dictating motion of a bidirectional vehicle. The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
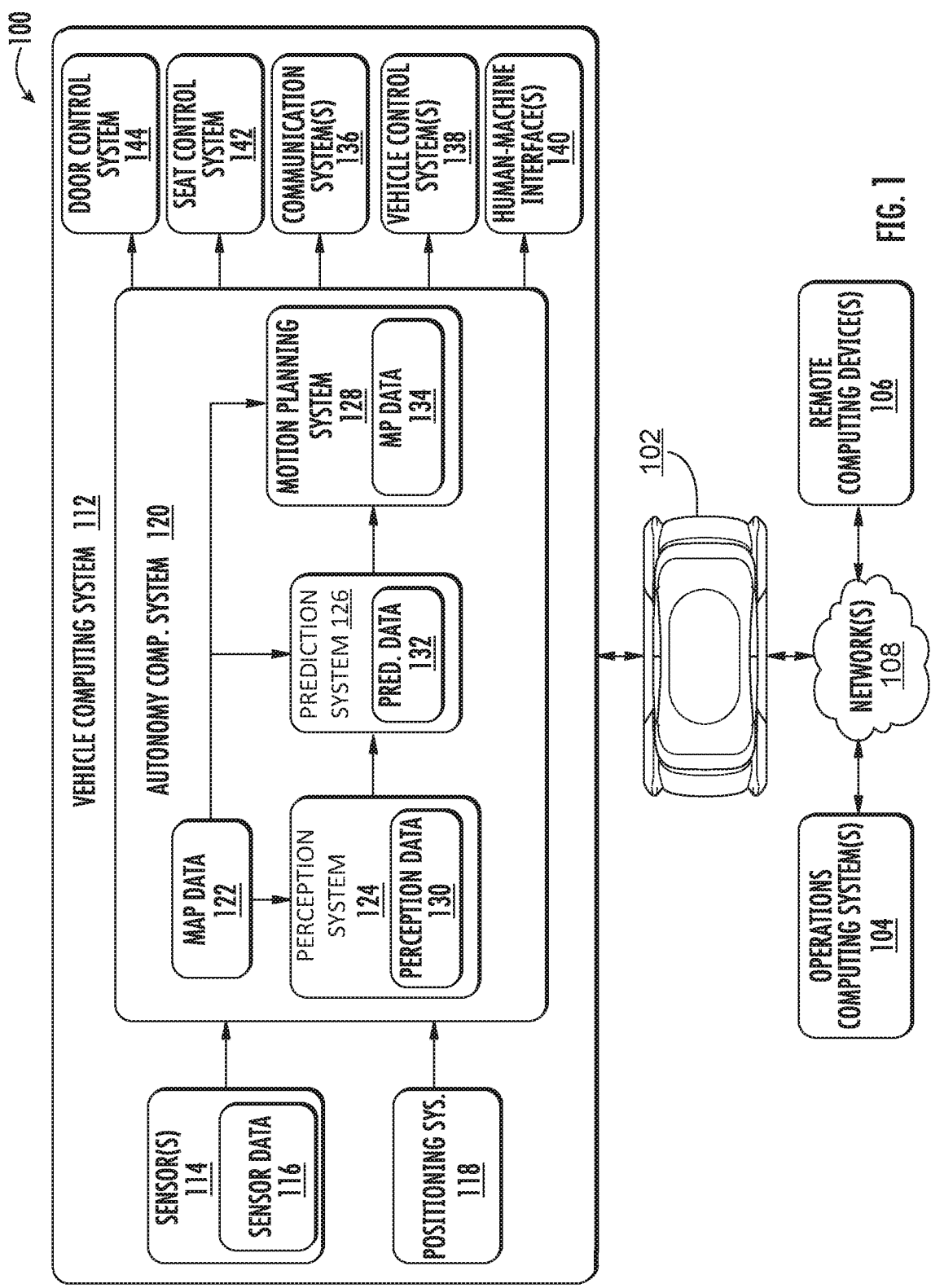
FIG. 1 depicts a block diagram of an example system according to example implementations of the present disclosure.

Aspects of the present disclosure are directed to improved systems and methods for determining the motion of bidirectional vehicles. In particular, aspects of the present disclosure are directed to dictating motion and mapping constraints for autonomous bidirectional vehicles. A bidirectional vehicle, for example, can include a vehicle with a forward facing end and a rear facing end opposite the forward facing end. The forward facing end and the rear facing end can be defined by the direction of travel of the vehicle. For instance, a vehicle can be capable of travelling in at least two directions with the same motion capabilities (e.g., speed, turning, signaling, etc.). In a first direction of travel a first end of the vehicle can be the forward facing end and a second end of the vehicle can be the rear facing end, whereas in a second direction of travel the first end of the vehicle can be the rear facing end and the second end of the vehicle can be the forward facing end. Thus, depending on the orientation, either end of the vehicle can be considered the "front" of the vehicle when traveling (e.g., at a high rate of speed on a highway). In this manner, a bidirectional vehicle can be capable of multiple orientations defined by its direction of travel while still complying with the rules, laws, and regulations of the area in which it is travelling, as further described herein. As described in detail herein, the bidirectional vehicle can include dynamic seat reconfigurations that can determine a passenger's orientation within the vehicle with respect to the vehicle's orientation (e.g., a passenger facing towards the front facing end can have a front facing orientation, etc.).

A computing system can determine a route for a bidirectional vehicle to travel based on a vehicle's orientation. For instance, the computing system can obtain passenger orientation data (e.g., a passenger's position within the vehicle, orientation with respect to the vehicle orientation, etc.) and any other passenger data (e.g., age, seat preference, susceptibility to motion sickness, handicap, luggage, etc.) associated with a passenger of the bidirectional vehicle. The computing system can determine motion constraints (e.g., a speed limit, a direction of travel, etc.) for the bidirectional vehicle based on the passenger orientation and/or other passenger data. A motion constraint, for example, can identify a direction of travel such that a passenger orientation is facing forward with respect to the vehicle. In addition, the computing system can determine map constraints based on map data identifying route attributes (e.g., passenger orientation restrictions, speed limits, turn radius, etc.) for a plurality of route segments, the passenger orientation, and/or other passenger data. The computing system can generate a constrained route for the bidirectional vehicle to travel based on the determined constraints. By way of example, the computing system can determine a constrained route such that a passenger orientation is front facing with respect to the vehicle's direction of travel in the event that a passenger suffers from motion sickness. Moreover, the route can be generated around one or more route segments restricted by the determined forward motion of the vehicle. In this manner, the systems and methods of the present disclosure can dynamically determine a route for a bidirectional vehicle based on the vehicle's orientation and a passenger's orientation with respect to the vehicle. Each constrained route can be tailored for different route or passenger attributes. In this way, the computing system can increase the passenger comfort and safety while riding in bidirectional vehicles.

The following describes the technology of this disclosure within the context of a bidirectional autonomous vehicle for example purposes only. As described herein, the technology described herein is not limited to autonomous or bidirectional vehicles and can be implemented within other robotic and computing systems, such as those utilized by a ride-sharing and/or delivery services.

An autonomous vehicle can include a computing system (e.g., a vehicle computing system) with a variety of components for operating with minimal and/or no interaction from a human operator. For example, the computing system can be located onboard the autonomous vehicle and include one or more sensors (e.g., cameras, Light Detection and Ranging (LiDAR), Radio Detection and Ranging (RADAR), etc.), an autonomy computing system (e.g., for determining autonomous navigation), one or more vehicle control systems (e.g., for controlling braking, steering, powertrain), etc. The autonomy computing system can include a number of sub-systems that cooperate to perceive the surrounding environment of the autonomous vehicle and determine a motion plan for controlling the motion of the autonomous vehicle.

For example, the autonomy computing system can include a perception system configured to perceive one or more objects within the surrounding environment of the autonomous vehicle, a prediction system configured to predict a motion of the object(s) within the surrounding environment of the autonomous vehicle, and a motion planning system configured to plan the motion of the autonomous vehicle with respect to the object(s) within the surrounding environment of the autonomous vehicle. For example, the motion planning system can determine a motion plan in accordance with a determined route and/or one or more objects along the route. In some implementations, one or more of the number of sub-systems can be combined into one system. For example, an autonomy computing system can include a perception/prediction system configured to perceive and predict a motion of one or more objects within the surrounding environment of the autonomous vehicle.

The vehicle computing system can include and/or be associated with a plurality of external sensors (e.g., LiDAR sensors, outward facing cameras, etc.) and/or internal sensors (e.g., tactile sensors (e.g., touch sensors within seats of a vehicle interior, on the handle of a vehicle door, etc.), internal facing microphones, internal facing cameras, etc.). As discussed herein, the plurality of sensors can be utilized by the vehicle computing system to gather internal data associated with a vehicle such as, for example, occupancy data identifying the position and/or orientation of one or more passengers riding within the vehicle.

By way of example, an autonomous vehicle can include a vehicle interior defining a longitudinal direction, a lateral direction, and a vertical direction. The vehicle interior can include one or more vehicle seats to support one or more passengers of the vehicle and/or one or more vehicle doors to enable the one or more passengers to enter and/or exit the vehicle interior. For instance, the vehicle interior can include a floorboard with one or more mechanical components (e.g., sliding tracks, spring loaded levers, locking pins, and/or other locking mechanisms, etc.) placed therein configured to couple one or more mechanical components (e.g., sliding skids, wheels, spring loaded levers, locking pins, and/or any the attachment mechanisms, etc.) of the vehicle seats to the floor of the vehicle interior. The mechanical components can be placed throughout the floor of the vehicle interior to enable a plurality of different seat configurations within the autonomous vehicle.

For example, the autonomous vehicle can be capable of adjusting its vehicle interior to provide for one or more dynamic seat reconfigurations to more efficiently provide a number of specialized services. More particularly, the autonomous vehicle can include one or more seats that can individually or collectively be reconfigured (e.g., reconfiguration of a seat orientation and/or a seat position). As an example, a seat of the autonomous vehicle can change a location inside the autonomous vehicle (e.g., by sliding longitudinally along a track inside the cabin of the autonomous vehicle, etc.). As another example, a seat of the autonomous vehicle can change an orientation inside the autonomous vehicle (e.g., fully retracting a headrest in the seat, changing an angle of the seat back of the seat, folding the seat back onto the seat base of the seat to form a table, etc.). In such fashion, the seating arrangement of seats in the autonomous vehicle can be dynamically reconfigured to more efficiently provide a number of different services. As discussed herein, the vehicle computing system can identify a vehicle layout indicative of a seating arrangement within the vehicle interior.

The autonomous vehicle can include a bidirectional vehicle. The bidirectional vehicle, for example, can define a longitudinal direction, a lateral direction, and a vertical direction. The vehicle can have at least two ends spaced apart along the longitudinal direction. The two ends can include two portions of the vehicle longitudinally opposite one another. Each end can include a forward end and/or a rear end depending on the directionality of the autonomous vehicle. For instance, the forward end and the rear end can be defined by the direction of travel of the bidirectional vehicle. Moreover, each end can be substantially similar so that either end can be appropriately considered the "front" of the vehicle for travelling purposes.

The two ends of the bi-directional vehicle can be substantially the same in visual appearance and/or capability. By way of example, the autonomous vehicle can include a first set of wheels (e.g., one wheel, two wheels, etc.) placed proximate to a first end of the autonomous vehicle and a second set of wheels placed proximate to a second end of the autonomous vehicle. Each set of wheels can be configured to steer the autonomous vehicle such that either the first end or the second end can act as the front/back of the vehicle. For instance, the vehicle can be configured travel by turning the front wheels of the vehicle. The vehicle can travel and/or steer the autonomous vehicle in a first direction of travel by turning the first set of wheels. In such a case, the first end can be defined as the forward end of the vehicle and the second end can be defined as the rear end of the vehicle. In addition, the vehicle can travel and/or steer in a second direction of travel by turning the second of wheels. In such a case, the first end can be defined as the rear end of the vehicle and the second end can be defined as the forward end of the vehicle. In addition, or alternatively, one set of wheels can be configured to steer the autonomous vehicle. In such a case, the vehicle can be front wheel steered or back wheel steered. As an example, the first set of wheels can be configured to steer the vehicle. Moreover, both ends of the autonomous vehicle can include signaling elements that would allow either end to serve as the "rear" of the vehicle (e.g., rear turn signals, brake lights, etc.) as well as the "front" of the vehicle (e.g., headlights (with brightness adjustment), daytime running lights, front turn signals, etc.). In such a case, the vehicle can utilize front wheel steering when traveling in the first direction of travel and rear wheel steering when traveling in the second direction of travel.

A computing system of the present disclosure can determine motion and/or mapping constraints to constrain the movement of the autonomous vehicle based on the vehicle's orientation (e.g., as defined by the vehicle's direction of travel), data associated with passengers of the vehicle (e.g., a passenger's orientation relative to the vehicle and/or other passenger attributes), map data, and/or any other data for routing a bidirectional vehicle. For example, the autonomous vehicle can be configured to provide a transportation service for one or more passengers of the autonomous vehicle.

To do so, the computing system (e.g., an autonomous vehicle computing system, an operations computing system, etc.) can obtain a service request from at least one passenger for a vehicle service. The service request can include and/or be associated with service request data indicating a service to be provided by the autonomous vehicle. For example, the service request can include a request for a transportation service from an origin location (e.g., a pickup location) and a destination location (e.g., drop-off location). The service request can include a service type (e.g., a tiered service type from premium services to pooling service, etc.), a number of passengers, and/or passenger request data for at least one of the passengers. The passenger request data, for example, can include and/or be indicative of one or more passenger preferences and/or passenger attributes. For instance, the one or more passenger preferences (e.g., passenger preference data) can be indicative of a seat preference, a passenger orientation preference, etc. As another example, the one or more passenger attributes (e.g., passenger attribute data) can include an age, a susceptibility to motion sickness, a special accommodation (e.g., wheelchair usage, etc.), amount of luggage, and/or any other ride related attribute for a passenger.

The computing system can assign the autonomous vehicle to pick up the at least one passenger at the origin location. In some implementations, the computing system can assign a seat of the vehicle to the at least one passenger based on the passenger request data. For instance, the computing system can obtain vehicle data. The vehicle data can identify a vehicle layout indicative of an interior configuration of the vehicle interior and/or an occupancy of the vehicle interior. As an example, the interior configuration for the vehicle can be indicative of one or more vehicle doors and/or one or more passenger seats within the vehicle interior. For instance, the interior configuration can identify the placement of the one or more vehicle doors and/or passenger seats. In addition, the vehicle data can include occupancy data that is indicative of a plurality of passengers within the vehicle. In some implementations, the occupancy data can identify the location of each passenger within the vehicle and/or the orientation of each passenger relative to the orientation of the vehicle. For example, the occupancy data can identify each of the one or more seats as occupied and/or unoccupied by a passenger of the vehicle. In some implementations, the occupancy data can be determined by one or more internal vehicle sensors (e.g., internal camera, weight sensors, etc.).

In some implementations, the computing system can assign a seat of the vehicle to the at least one passenger based on the passenger request data and/or the vehicle data. For example, the computing system can determine an assigned seat of the bidirectional vehicle for the at least one passenger based on occupancy data associated with the bidirectional vehicle and/or the one or more passenger attributes associated with the at least one passenger. As an example, the computing system can assign an unoccupied seat to the passenger (e.g., as determined by the occupancy data).

In some implementations, the computing system can determine a pickup route to pick up the at least one passenger based on the assigned seat. For instance, as described in further detail herein, the computing system can select at least one vehicle door (e.g., a pick-up door) of the bidirectional vehicle for the at least one passenger to access the bidirectional vehicle based on the assigned seat. The pick-up door, for example, can be determined based on the position of the door relative to the seat assigned to the at least one passenger (e.g., the door closest to the assigned seat). In addition, the computing system can determine a pick-up location based on the pick-up door and/or the origin location and generate a route to the pick-up location. For instance, the route can direct the vehicle to pick-up the at least one passenger such that the assigned vehicle door is facing a curb or other safe area during the pick-up.

More particularly, the computing system can be configured to generate a route to pick up the at least one passenger at or proximate to the origin location (e.g., a pick-up route) and drop off the at least one passenger at or proximate to the destination location (e.g., a drop-off route). The route can include a constrained route determined based on passenger data, vehicle data, map data, and/or any other data associated with a transportation service. For example, the computing system can obtain passenger data associated with the at least one passenger, the vehicle data described above, and/or map data indicative of one or more route segments.

For example, the computing system can obtain passenger data for at least one passenger of the bidirectional vehicle. The passenger data, for example, can include passenger orientation data and/or one or more passenger attributes for the at least one passenger associated with the service request. The passenger orientation data can be indicative of at least one of a current position, a predicted position, a current orientation and/or a predicted orientation of the at least one passenger within the bidirectional vehicle (e.g., current location/orientation after the at least one passenger is picked up by the vehicle, a predicted position/orientation before the passenger is picked up by the vehicle). By way of example, the passenger orientation data can include seat information associated with a passenger seat corresponding the passenger (e.g., an assigned seat, a seat occupied by the passenger, etc.). The seat information can include an orientation of the passenger seat and/or the location of the passenger seat relative to the bidirectional vehicle. The passenger orientation data, for example, can be obtained based, at least in part on the occupancy data associated with the vehicle. For example, the passenger orientation data can be indicative of an orientation and position of each of a plurality of passengers within the bi-directional vehicle including the orientation and/or position of the at least one passenger associated with the service request.

In addition, or alternatively, the passenger data can include passenger attribute data and/or passenger preference data. The passenger preference data can identify one or more seat preferences, a passenger orientation preference, etc. for the at least one passenger. The passenger attribute data can identify one or more passenger attributes for the at least one passenger such as, for example, a passenger age, a susceptibility to motion sickness, a handicap, an amount of luggage, and/or any other transportation related attribute for a passenger. In some implementations, the passenger attribute and/or preference data can be obtained based at least in part on the service request data associated with the service request received for the at least one passenger. For example, the passenger data can be obtained from the passenger in response to the request for the transportation service. By way of example, the passenger preference and/or attribute data can be obtained through user input such as, for example, via user selectable features while requesting a transportation service.

In addition, or alternatively, the at least one passenger can include a user of a transportation service. For instance, the computing system and/or the bidirectional vehicle can be associated with a transportation service provider. In such a case, the passenger preference and/or attribute data can include data associated with the at least one passenger through a user profile and/or historical data such as, for example, one or more previous transportation services, etc. The passenger preference and/or attribute data can be obtained through user input such as, for example, via user selectable features while creating a user profile. In this manner, the passenger preference and/or attribute data can be obtained from a user profile associated with the at least one passenger.

The computing system can determine one or more motion constraints for the bidirectional vehicle based on the passenger data. For instance, the computing system can determine one or more motion constraints for the bidirectional vehicle based on the passenger orientation data. In addition, or alternatively, the computing system can determine one or more motion constraints for the bidirectional vehicle based on the one or more passenger preferences and/or attributes. The one or more motion constraints can include a speed threshold, an elevation threshold, a turning radius threshold, a directionality restraint, and/or any other restraint on the motion of the bidirectional vehicle. By way of example, a speed threshold, elevation threshold, and/or turning radius threshold can be determined for the bidirectional vehicle based on the at least one passenger's orientation with respect to the bidirectional vehicle's direction of travel. For instance, a higher speed, elevation, turning radius, etc. threshold can be determined in the event that the passenger is facing forward with respect to the bidirectional vehicle's direction of travel. As another example, a lower speed, elevation, turning radius, etc. threshold can be determined in the event that the passenger is facing backward with respect to the bidirectional vehicle's direction of travel. In this manner, a bidirectional vehicle can reduce its speed, elevation gain, or turning radius to compensate for a passenger's orientation with the bidirectional vehicle.

In addition, or alternatively, the computing system can determine that the at least one passenger is associated with a motion constraint requirement based, at least in part, on the passenger data. A motion constraint requirement can include, for example, an age constraint, a susceptibility to motion sickness constraint, a handicap constraint, and/or any other constraint that may justify limited vehicle mobility, etc. Each motion constraint requirement, for example can be indicative of a limiting passenger attribute/preference that can be compensated for by restricting the motion of the bidirectional vehicle. By way of example, a motion constraint requirement can indicate that a passenger suffers from motion sickness that can be compensated for (e.g., lessen severity of symptoms) by a directionality restriction on the motion of the bidirectional vehicle such that the at least one passenger is facing forward with respect to the motion of the vehicle during the transportation service.

More particularly, the computing system can determine that the at least one passenger is associated with an age that achieves an age threshold. For instance, the passenger can be associated with an age under a minimum age threshold and/or over a maximum age threshold. The minimum age threshold can identify an age below which a passenger should be facing forward and/or backward (e.g., in a child seat, etc.) with respect to the direction of the vehicle. The maximum age threshold can identify an age above which a passenger should be facing forward and/or backward with respect to the direction of the vehicle. For example, passengers under and/or over an age threshold can be required to face forward and/or backward with respect to the motion of a vehicle to ensure safety and/or adhere to safety standards.

As another example, the computing system can determine that the at least one passenger is associated with at least one predefined accommodation. The at least one predefined accommodation can include one of a plurality of accommodations. Each of the plurality of accommodations can identify an accommodation requiring a forward facing orientation of a passenger. By way of example, a passenger associated with a wheelchair accommodation can be required to face forward with respect to the motion of a vehicle to ensure safety and/or adhere to safety standards. In another example, the computing system can determine that a child seat is positioned within a seat of the autonomous vehicle. Such a determination can be based on sensor data acquired from interior sensors (e.g., cameras of the autonomous vehicle, weight sensors, seat belt sensors, etc.), user inputted information (e.g., a child seat request or other indication in the service request, etc.), and/or other techniques. The computing system can determine that the bi-directional vehicle should be constrained to travel such that the passenger is facing rearward or forward (e.g., depending on the appropriate legal/regulatory standard for the area stored in an accessible database, user preferences, etc.). As such, motion constraints can be defined to ensure that the vehicle's forward motion (e.g., high speed forward motion) allows for such a circumstance.

In addition, or alternatively, as referenced above, the computing system can determine that the at least one passenger is associated with a susceptibility to motion sickness that achieves a sickness threshold. The sickness threshold can identify a level of motion sickness that can be affected by a passenger's orientation with respect to the motion of a vehicle. For example, sitting backwards (e.g., in the opposite direction of the motion of travel of the vehicle) can aggravate potential motion sickness symptoms. Therefore, a passenger associated with a susceptibility to motion sickness can be required to face forward with respect to the motion of a vehicle to ensure the comfort of the passenger. The sickness threshold can be a static sickness rating and/or a dynamic sickness rating. For instance, in some implementations, the computing system can determine a sickness threshold for each predicted route to complete a transportation service. The computing system can determine the sickness threshold for each route based on attributes associated with route segments (e.g., route attributes discussed in more detail herein) making up each route. For instance, rougher routes (e.g., routes with one or more potholes, higher elevation gain, steep turns, etc.) can be associated with a higher sickness threshold, whereas smoother routes (e.g., low elevation gain, no turns, newly paved, etc.) can be associated with a lower sickness threshold.

In some implementations, the computing system can determine the one or more motion constraints for the bidirectional vehicle based, at least in part, on the one or more of the motion constraint requirements and a forward facing direction associated with the at least one passenger. For instance, the computing system can determine a forward facing direction associated with the at least one passenger based, at least in part, on the passenger orientation data. The one or more motion constraints can include a directionality constraint. The directionality constraint can include a restriction on the movement of the bidirectional vehicle such that the passenger orientation of the at least one passenger is in the forward facing direction relative to the movement of the vehicle. For instance, the directionality constraint can restrict the movement of the bidirectional vehicle to the forward facing direction associated with the at least one passenger. In this manner, the directionality constraint can be indicative of the forward facing direction associated with the at least one passenger. The one or more motion constraints for the bidirectional vehicle can include the directionality constraint in the event the at least one passenger is associated with a motion constraint requirement.

In some implementations, the computing system can obtain map data. The map data can be indicative of one or more route attributes for one or more of a plurality of route segments. The one or more route attributes, for example, can include one or more passenger orientation restrictions for the at least one passenger while traveling a respective route segment. By way of example, a passenger orientation restriction can require that a passenger travel along one or more route segments in a forward facing orientation with respect to the motion of the vehicle. For instance, one or more route segments along a highway or other fast and/or potentially hazardous roadway can be associated with a passenger orientation restriction to ensure passenger safety.

In addition, or alternatively, the one or more route attributes for a respective route segment of the plurality of route segments can include a respective speed (e.g., minimum speed, maximum speed, average speed, etc.), a respective elevation gain (e.g., average change in elevation, highest elevation point, etc.), a respective turning radius (e.g., average turning radius, sharpest turn along the route segment, etc.), and/or any other aspect associated with the respective route segment. The respective speed, for example, can be indicative of at least one of one or more speed limits or an average speed for the respective route segment. The respective elevation gain can be indicative of at least one of one or more maximum elevation gains or an average elevation gain for the respective route segment. And, the respective turning radius can be indicative of at least one of one or more maximum turning angles or an average turning angle for the respective route segment.

In some implementations, the one or more route attributes for one or more of the plurality of route segments can include one or more comfort ratings. The one or more comfort ratings, for example, can be based on historical data. For example, the computing system can obtain user rating data from the at least one passenger indicative of a comfort rating associated with at least one route segment of the plurality of route segments. The computing system can determine at least one attribute (e.g., comfort ratings) of the at least one route segment based, at least in part, on the user rating data.

In addition, or alternatively, the map data can be indicative of one or more safe drop off and/or pick up locations. By way of example, the one or more safe drop off and/or pick up locations can include one or more roadway curbs, parking lots, medians, driveways, etc. The one or more safe drop off and/or pick up locations can include a respective side of a route segment. For instance, a route segment can be associated with one or more safe drop off and/or pick up locations along a first side (e.g., a curb side) of the route segment and/or one or more hazardous drop off and/or pick up locations along a second side (e.g., a traffic side) of the route segment.

The computing system can determine one or more motion constraints (e.g., vehicle orientation constraints) for the bidirectional vehicle based, at least in part, on the vehicle layout, the passenger orientation data, and/or the map data. For instance, the one or more motion constraints can include a pick-up and/or drop-off vehicle orientation constraint indicative of a vehicle orientation at a pick-up location and/or a drop off location. The vehicle orientation, for example, can identify an orientation of the bidirectional vehicle with respect to one or more route segments. For example, a vehicle orientation can identify a side and/or door of the bidirectional vehicle that faces a first and/or second side of a respective route segment.

By way of example, as referenced above, the computing system can select a vehicle door of the one or more vehicle doors of the bidirectional vehicle to facilitate the ingress and/or egress of at least one passenger to the bidirectional vehicle. The vehicle door can be selected based on the vehicle layout and/or the passenger orientation data. For example, the vehicle door can be within a proximity threshold to the at least one passenger. By way of example, the vehicle door can be selected based, at least in part, on the position of the at least one passenger with respect to a plurality of other passengers of the bidirectional vehicle. For instance, the vehicle door can be selected such that the at least one passenger can enter and/or exit the vehicle with minimal interference to the plurality of other passengers. The computing system can determine at least one vehicle orientation constraint based, at least in part, on the vehicle door and at least one of the one or more safe drop off and/or pick up locations associated with a route segment. For example, the at least one vehicle orientation constraint can be indicative of the vehicle door facing a safe drop off and/or pick up location (e.g., a roadway curb).

The computing system can determine one or more map constraints based on the passenger data, the map data, and/or the one or more motion constraints. The one or more map constraints, for example, can be indicative of one or more restricted route segments of the plurality of route segments. In some implementations, the one or more restricted route segments can be associated with at least one passenger orientation restriction. For instance, one or more route segments associated with a passenger orientation restriction that requires passengers of vehicle to face forward with respect to motion of the bidirectional vehicle can be restricted in the event that one or more passengers of the bidirectional vehicle are facing opposite to the direction of travel.

In addition, or alternatively, the one or more map constraints can be based, at least in part, on one or more other motion constraints such as, for example, a speed constraint, elevation constraint, turning radius constraint, etc. For instance, one or more of the restricted route segments can be associated with at least one of a restricted speed that achieves a speed threshold, a restricted elevation gain that achieves an elevation gain threshold, a restricted turning radius that achieves a turning radius threshold, etc. By way of example, the speed threshold, elevation gain, and/or turning radius threshold can depend on the passenger data associated with the at least one passenger. For instance, a speed, elevation, and/or turning radius threshold can depend on passenger attributes such that, for example, a threshold can be lower for a passenger who suffers from motion sickness than for a passenger who does not. In addition, the speed, elevation, and/or turning radius thresholds can depend on the passenger orientation of the at least one passenger. For instance, a threshold can be lower for a passenger facing opposite the direction of travel of the bidirectional vehicle, than a threshold for a passenger in a forward facing orientation with respect to the direction of travel of the bidirectional vehicle. In this manner, map constraints can restrict rougher route segments in the event that a passenger is facing opposite the direction of travel.

Moreover, in some implementations, the one or more restricted route segments can include one or more route segments associated with a comfort rating that fails to achieve a minimum comfort rating associated with the at least one passenger. For example, the computing system can determine a minimum comfort rating for the at least one passenger based, at least in part, on the one or more passenger attributes associated with the at least one passenger. For instance, a passenger attribute can include minimum comfort preference, etc. By way of example, a request for the transportation service can include a requested comfort level.

The computing system can generate a constrained route for the bidirectional vehicle based, at least in part, on the one or more motion and/or map constraints. For example, the constrained route can include a route in the forward facing direction associated with the at least one passenger in the event that the at least one passenger is associated with a motion constrain requirement (e.g., motion sickness, age, etc.). In addition, or alternatively, the constrained route can include one or more unrestricted route segments different than the restricted route segments. The unrestricted route segments, for example, can include route segments that achieve any map constraints determined for the transportation service (and/or the at least one passenger).

The constrained route can include a pick-up route and/or a drop off route. The computing system can determine the pick-up route by determining a safe pick-up location based on the map data, the origin location, and/or an assigned/predicted seat for the at least one passenger. The pick-up route can include one or more unrestricted route segments determined based on the passenger data (e.g., passenger orientation, attributes, preferences, etc.) associated with one or more passengers within the bidirectional vehicle during the pick-up route.

In addition, the computing system can determine a drop off route by determining a safe drop off location. The safe drop off location can be determined based, at least in part, on at least one roadway curb associated with a route segment within a proximity to the destination location. The drop off route can include one or more unrestricted route segments determined based on the passenger data (e.g., passenger orientation, attributes, preferences, etc.) associated with the at least one passenger and/or one or more other passengers within the bidirectional vehicle during the drop off route. In addition, the computing system can generate the constrained route to the drop off location based, at least in part, on a vehicle orientation determined for the drop off location. The constrained route, for example, can direct the bidirectional vehicle to reach the drop off location at the at least one vehicle orientation.

In some implementations, the computing system can obtain a drop off schedule indicative of an order to drop off each a plurality of passengers of the bidirectional vehicle (e.g., where the bidirectional vehicle is configured to provide a car pooling service). In such a case, the computing system can determine the drop off route based on the drop off schedule. For instance, the drop off route can include one or more drop off locations along the drop off route. In some implementations, the occupancy data (e.g., the passenger orientation data for each of the passengers within the bidirectional vehicle) can be determined during the drop off route after reaching each drop off location. In such a case the computing system select a vehicle door and, accordingly, another drop-off location and/or vehicle orientation for the at least one passenger to exit the vehicle based, at least in part, on the drop off schedule. For instance, the vehicle door can change depending on the presence and/or absence of other passengers between the at least one passenger and the one or more vehicle doors of the bidirectional vehicle. In this manner, a drop off route can be determined based, at least in part, on a drop off schedule.

The computing system can initiate a motion of the bidirectional vehicle based, at least in part, on the constrained route. For example, the computing system can include a transportation services system (e.g., an operations computing system) communicatively connected to one or more onboard computing systems (e.g., the vehicle computing system) of the bidirectional vehicle. The computing system can provide the constrained route and/or one or more command instructions for initiating the constrained route to the bidirectional vehicle. The bidirectional vehicle can receive data indicative of the constrained route and/or the one or more command instructions and, in response, can initiate a motion of the vehicle in accordance with the constrained route. By way of example, the bidirectional vehicle can be configured to generate a motion plan and/or one or more vehicle trajectories for traveling in accordance with the constrained motion plan.

The systems and methods described herein provide a number of technical effects and benefits. For instance, by determining a constrained route based on the orientation of passengers riding within a vehicle, a computing system safely and effectively utilize bidirectional vehicles to provide transportation services for a wide variety of unique passengers over a wide variety of different route segments. Moreover, the constrained route can facilitate safer pick up and drop off procedures by matching a vehicle entry/exit point to a safe location such as a parking curb rather than allowing passengers to exit the vehicle into potentially hazardous areas such oncoming traffic. This can improve ride-sharing operations by tailoring transportation routes to the attributes and preferences of passengers being transported along those routes, as well as, potential vehicle orientation and/or other roadway restrictions that may be faced by bidirectional autonomous vehicles. In this manner, the systems and methods described herein can improve the performance of vehicle routing services in general, particularly those utilizing bidirectional vehicles. Ultimately, this can lead to safer, more comfortable, and uniquely tailored ride sharing operations.

Example aspects of the present disclosure can provide a number of improvements to computing technology such as, for example, ride sharing transportation computing technology. For instance, the systems and methods of the present disclosure can provide an improved approach for dictating motion for bidirectional vehicles. For example, a computing system can obtain passenger orientation data for at least one passenger of a bidirectional vehicle. The computing system can determine one or more motion constraints for the bidirectional vehicle based, at least in part, on the passenger orientation data. The computing system can generate a constrained route for the bidirectional vehicle based, at least in part, on the one or more motion constraints. And, the computing system can initiate a motion of the bidirectional vehicle based, at least in part, on the constrained route. In addition, the computing system can obtain map data indicative of one or more route attributes for one or more of a plurality of route segments. The one or more route attributes can include one or more passenger orientation restrictions for at least one passenger. The computing system can determine one or more map constraints based, at least in part, on the passenger data and the map data. And, the computing system can generate a constrained route based, at least in part, on the one or more map constraints.

In this manner, the computing system can employ improved techniques (e.g., routing techniques) to determine a transportation route for a bidirectional vehicle. Moreover, the computing system can accumulate and utilize newly available information such as, for example, orientation data descriptive of the orientation of a vehicle, passengers within a vehicle, and road segments with respect to one another. In this way, the computing system provides a practical application that enables the safe and efficient routing of bidirectional vehicles. Ultimately, this can lead to safer ride sharing operations which can result in a more efficient allocation of transportation.

Various means can be configured to perform the methods and processes described herein. For example, a computing system can include data obtaining unit(s), constraint unit(s), routing unit(s), initiation unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s), etc.) can be configured to obtain passenger orientation data for at least one passenger of a bidirectional vehicle. The passenger orientation data can be indicative of at least one of a position or an orientation of the at least one passenger within the bidirectional vehicle. In addition, the means (e.g., data obtaining unit(s), etc.) can be configured to obtain map data indicative of one or more route attributes for one or more of a plurality of route segments. The one or more route attributes can include one or more passenger orientation restrictions for the at least one passenger.

The means (e.g., constraint unit(s), etc.) can be configured to determine one or more motion constraints for the bidirectional vehicle based, at least in part, on the passenger orientation data. In addition, the means (e.g., constraint unit(s), etc.) can be configured to determine one or more map constraints based, at least in part, on the passenger data and the map data. The one or more map constraints can be indicative of one or more restricted route segments of the plurality of route segments. The one or more restricted route segments can be associated with at least one passenger orientation restriction.

The means (e.g., routing unit(s), etc.) can be configured to generate a constrained route for the bidirectional vehicle based, at least in part, on the one or more motion constraints. In addition, the means (e.g., routing unit(s), etc.) can be configured to generate a constrained route based, at least in part, on the one or more map constraints. The constrained route can include one or more unrestricted route segments different than the restricted route segments. The means (e.g., initiation unit(s), etc.) can be configured to initiate a motion of the bidirectional vehicle based, at least in part, on the constrained route.

With reference now to FIGS. 1-11, example embodiments of the present disclosure will be discussed in further detail. FIG. 1 depicts a block diagram of an example system 100 for controlling the navigation of a vehicle according to example embodiments of the present disclosure. As illustrated, FIG. 1 shows an example system 100 that can include an autonomous vehicle 102, an operations computing system 104, one or more remote computing devices 106, a communication network 108, a vehicle computing system 112, one or more sensors 114, sensor data 116, a positioning system 118, an autonomy computing system 120, map data 122, a perception system 124, a prediction system 126, a motion planning system 128, state data 130, prediction data 132, motion plan data 134, a communication system 136, a vehicle control system 138, a human-machine interface 140; a seat control system 142; and a door control system 144.

The operations computing system 104 can be associated with a service provider (e.g., service entity) that can provide one or more vehicle services to a plurality of users via a fleet of vehicles (e.g., service entity vehicles, third-party vehicles, etc.) that includes, for example, the autonomous vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the autonomous vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with the operation of one or more vehicles (e.g., a fleet of vehicles), with the provision of vehicle services, and/or other operations as discussed herein.

For example, the operations computing system 104 can be configured to monitor and communicate with the autonomous vehicle 102 and/or its users to coordinate a vehicle service provided by the autonomous vehicle 102. To do so, the operations computing system 104 can manage a database that stores data including vehicle status data associated with the status of vehicles including autonomous vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), and/or the state of objects internal and/or external to a vehicle (e.g., the physical dimensions and/or appearance of objects internal/external to the vehicle).

The operations computing system 104 can communicate with the one or more remote computing devices 106 and/or the autonomous vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the autonomous vehicle 102.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the autonomous vehicle 102 including exchanging (e.g., sending and/or receiving) data or signals with the autonomous vehicle 102, monitoring the state of the autonomous vehicle 102, and/or controlling the autonomous vehicle 102. The one or more remote computing devices 106 can communicate (e.g., exchange data and/or signals) with one or more devices including the operations computing system 104 and the autonomous vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the autonomous vehicle 102 including a location (e.g., latitude and longitude), a velocity, acceleration, a trajectory, and/or a path of the autonomous vehicle 102 based in part on signals or data exchanged with the autonomous vehicle 102. In some implementations, the operations computing system 104 can include the one or more remote computing devices 106.

The autonomous vehicle 102 can be a ground-based vehicle (e.g., an automobile, bike, scooter, other light electric vehicle, etc.), an aircraft, and/or another type of vehicle. The autonomous vehicle 102 can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, and/or a sleep mode. A fully autonomous (e.g., self-driving) operational mode can be one in which the autonomous vehicle 102 can provide driving and navigational operation with minimal and/or no interaction from a human driver present in the vehicle. A semi-autonomous operational mode can be one in which the autonomous vehicle 102 can operate with some interaction from a human driver present in the vehicle. Park and/or sleep modes can be used between operational modes while the autonomous vehicle 102 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the autonomous vehicle 102. Additionally, the autonomous vehicle 102 can provide data indicative of the state of the vehicle, the state of one or more passengers of the vehicle, and/or the state of an environment to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle). Furthermore, the autonomous vehicle 102 can provide data indicative of the state of the one or more objects (e.g., physical dimensions and/or appearance of the one or more objects) within a predefined distance of the autonomous vehicle 102 to the operations computing system 104, which can store an indication, record, and/or other data indicative of the state of the one or more objects within a predefined distance of the autonomous vehicle 102 in one or more memory devices associated with the operations computing system 104 (e.g., remote from the vehicle).

The autonomous vehicle 102 can include and/or be associated with the vehicle computing system 112. The vehicle computing system 112 can include one or more computing devices located onboard the autonomous vehicle 102. For example, the one or more computing devices of the vehicle computing system 112 can be located on and/or within the autonomous vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the autonomous vehicle 102 (e.g., its computing system, one or more processors, and other devices in the autonomous vehicle 102) to perform operations and functions, including those described herein.

As depicted in FIG. 1, the vehicle computing system 112 can include one or more sensors 114, the positioning system 118, the autonomy computing system 120, the communication system 136, the vehicle control system(s) 138, and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The sensor(s) 114 can include a plurality of external sensors (e.g., LiDAR sensors, outward facing cameras, etc.) and/or internal sensors (e.g., tactile sensors (e.g., touch sensors within seats of a vehicle interior, on the handle of a vehicle door, etc.), internal facing microphones, internal facing cameras, heat sensors, seat/floor weight sensors, etc.). As discussed herein, the internal sensor(s) can be utilized by the vehicle computing system 112 to gather internal sensor data associated with a vehicle 102 such as, for example, occupancy data identifying the state (e.g., the position and/or orientation) of one or more passengers riding within the vehicle 102.

For example, the one or more sensors 114 can be configured to generate and/or store data including the sensor data 116. The sensor data 116 can include the internal sensor data and/or autonomy sensor data associated with one or more objects that are proximate to the autonomous vehicle 102 (e.g., within range or a field of view of one or more of the one or more sensors 114 (e.g., external sensor(s)). For instance, the sensor(s) 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data can include image data, radar data, LIDAR data, and/or other data acquired by the sensor(s) 114. The one or more objects can include, for example, pedestrians, vehicles, bicycles, and/or other objects. The sensor(s) 114 can be located on various parts of the autonomous vehicle 102 including a vehicle interior, front side, rear side, left side, right side, top, or bottom of the autonomous vehicle 102. The autonomy sensor data can be indicative of locations associated with the one or more objects within the surrounding environment of the autonomous vehicle 102 at one or more times. For example, the autonomy sensor data can be indicative of one or more LIDAR point clouds associated with the one or more objects within the surrounding environment. The autonomy sensor(s) can provide autonomy sensor data to the autonomy computing system 120.

In addition to the sensor data 116, the autonomy computing system 120 can retrieve or otherwise obtain data including the map data 122. The map data 122 can provide detailed information about the surrounding environment of the autonomous vehicle 102. For example, the map data 122 can provide information regarding: the identity and location of different roadways, road segments, buildings, or other items or objects (e.g., lampposts, crosswalks and/or curb), the location and directions of traffic lanes (e.g., the location and direction of a parking lane, a turning lane, a bicycle lane, or other lanes within a particular roadway or other travel way and/or one or more boundary markings associated therewith), traffic control data (e.g., the location and instructions of signage, traffic lights, or other traffic control devices), and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the autonomous vehicle 102. The positioning system 118 can be any device or circuitry for analyzing the position of the autonomous vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the autonomous vehicle 102 can be used by various systems of the vehicle computing system 112 and/or provided to one or more remote computing devices (e.g., the operations computing system 104 and/or the remote computing device 106). For example, the map data 122 can provide the autonomous vehicle 102 relative positions of the surrounding environment of the autonomous vehicle 102. The autonomous vehicle 102 can identify its position within the surrounding environment (e.g., across six axes) based at least in part on the data described herein. For example, the autonomous vehicle 102 can process the autonomy sensor data (e.g., LIDAR data, camera data) to match it to a map of the surrounding environment to get an understanding of the vehicle's position within that environment (e.g., transpose the autonomous vehicle's 102 position within its surrounding environment).

The autonomy computing system 120 can include a perception system 124, a prediction system 126, a motion planning system 128, and/or other systems that cooperate to perceive the surrounding environment of the autonomous vehicle 102 and determine a motion plan for controlling the motion of the autonomous vehicle 102 accordingly. In some examples, many of the functions performed by the perception system 124, prediction system 126, and motion planning system 128 can be performed, in whole or in part, by a single structured machine-learning model. Thus, the functions described below with regards to the perception system 124, the prediction system 126, and the motion planning system 128 can be performed by one or more structured machine-learned models even if the descriptions below do not specifically discuss a machine-learned model.

As an example, the autonomy computing system 120 can receive the sensor data 116 from the one or more sensors 114, attempt to determine the state of the surrounding environment and/or the vehicle's interior by performing various processing techniques on the sensor data 116 (and/or other data). The autonomy computing system 120 can generate an appropriate motion plan through the surrounding environment based on state of the surrounding environment and the vehicle's interior. In some examples, the autonomy computing system 120 can use the sensor data 116 as input to a one or more machine-learned models that can detect objects within the sensor data 116, forecast future motion of those objects, and select an appropriate motion plan for the autonomous vehicle 102. The machine-learned model(s) can be included within one system and/or share one or more computing resources.

As another example, the perception system 124 can identify one or more objects that are proximate to and/or within the autonomous vehicle 102 based on sensor data 116 received from the sensor(s) 114. In particular, in some implementations, the perception system 124 can determine, for each object, state data 130 that describes the current state of such object. As examples, the state data 130 for each object can describe an estimate of the object's: current location (e.g., relative to one or more interior vehicle components, the surrounding environment of the vehicle, etc.); current speed; current heading (which may also be referred to together as velocity); current acceleration; current orientation (e.g., with respect to the direction of travel of the vehicle, etc.); size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate and/or within the autonomous vehicle 102 over time, and thereby produce a presentation of the world around and within the vehicle 102 along with its state (e.g., a presentation of the objects of interest within a scene/vehicle interior at the current time along with the states of the objects).

The prediction system 126 can receive the state data 130 from the perception system 124 and predict one or more future locations and/or moving paths for each object based on such state data 130. For example, the prediction system 126 can generate prediction data 132 associated with each of the respective one or more objects proximate and/or within the vehicle 102. The prediction data 132 can be indicative of one or more predicted future locations of each respective object. The prediction data 132 can be indicative of a predicted path (e.g., predicted trajectory) of at least one object within the interior and/or the surrounding environment of the autonomous vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the autonomous vehicle 102 based at least in part on the prediction data 132 (and/or other data). The motion plan data 134 can include vehicle actions with respect to the objects proximate to the autonomous vehicle 102 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the autonomous vehicle 102 can perform a certain action (e.g., pass an object) without increasing the potential risk to the autonomous vehicle 102 and/or violating any traffic laws (e.g., speed limits, lane boundaries, signage). The motion plan data 134 can include a planned trajectory, velocity, acceleration, and/or other actions of the autonomous vehicle 102.

As one example, in some implementations, the motion planning system 128 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the autonomous vehicle 102 approaches impact with another object and/or deviates from a preferred pathway (e.g., a predetermined travel route).

Thus, given information about the current locations and/or predicted future locations and/or moving paths of objects, the motion planning system 128 can determine a cost of adhering to a particular candidate pathway. The motion planning system 128 can select or determine a motion plan for the autonomous vehicle 102 based at least in part on the cost function(s). For example, the motion plan that minimizes the cost function can be selected or otherwise determined. The motion planning system 128 then can provide the selected motion plan to a vehicle control system 138 that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the autonomous vehicle 102.

The vehicle computing system 112 can include a communications system 136 configured to allow the vehicle computing system 112 (and it's one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems on-board the autonomous vehicle 102. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include one or more human-machine interfaces 140. For example, the vehicle computing system 112 can include one or more display devices located on the vehicle computing system 112. A display device (e.g., screen of a tablet, laptop, and/or smartphone) can be viewable by a user of the autonomous vehicle 102 that is located in the front of the autonomous vehicle 102 (e.g., driver's seat, front passenger seat). Additionally, or alternatively, a display device can be viewable by a user of the autonomous vehicle 102 that is located in the rear of the autonomous vehicle 102 (e.g., a passenger seat in the back of the vehicle).

In some implementations, the vehicle computing system 112 can include a seat control system 142 and/or a door control system 144. The seat control system 142 can be configured to control the operation of one or more configurable seats positioned within the interior of the autonomous vehicle 102. For instance, the seat control system 142 can include one or more actuators (e.g., electric motors) configured to control movement of the one or more configurable seats. As will be discussed herein, the seat control system 142 can configure the interior of the autonomous vehicle 102 to accommodate a plurality of different seating configurations.

The door control system 144 can be configured to control the operation of one or more door assemblies to permit access to the interior of the vehicle 102. For instance, the door control system 144 can include one or more actuators (e.g., electric motors) configured to control movement of the door assembly(s). More specifically, the one or more actuators can move the one or more door assemblies between an open position and a closed position to permit selective access to the interior of the autonomous vehicle 102. In addition, or alternatively, the door control system 144 can be configured to selectively lock and/or unlock the door assembly(s). In such a case, the door assembly(s) can permit the movement (e.g., from a closed position to an open position and/or vice versa) of the door assembly(s) when unlocked and prevent movement of the door assembly(s) when unlocked.

Figure 2A:
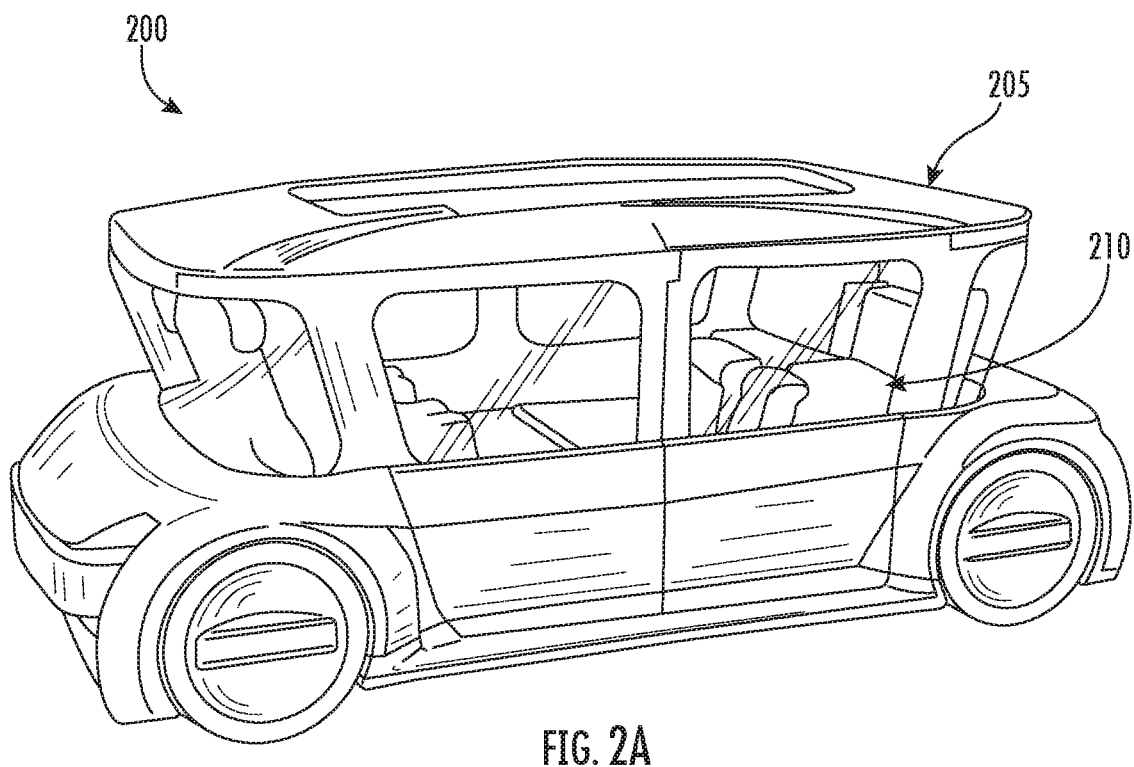
FIG. 2A depicts an autonomous vehicle according to example embodiments of the present disclosure.
Figure 2B:
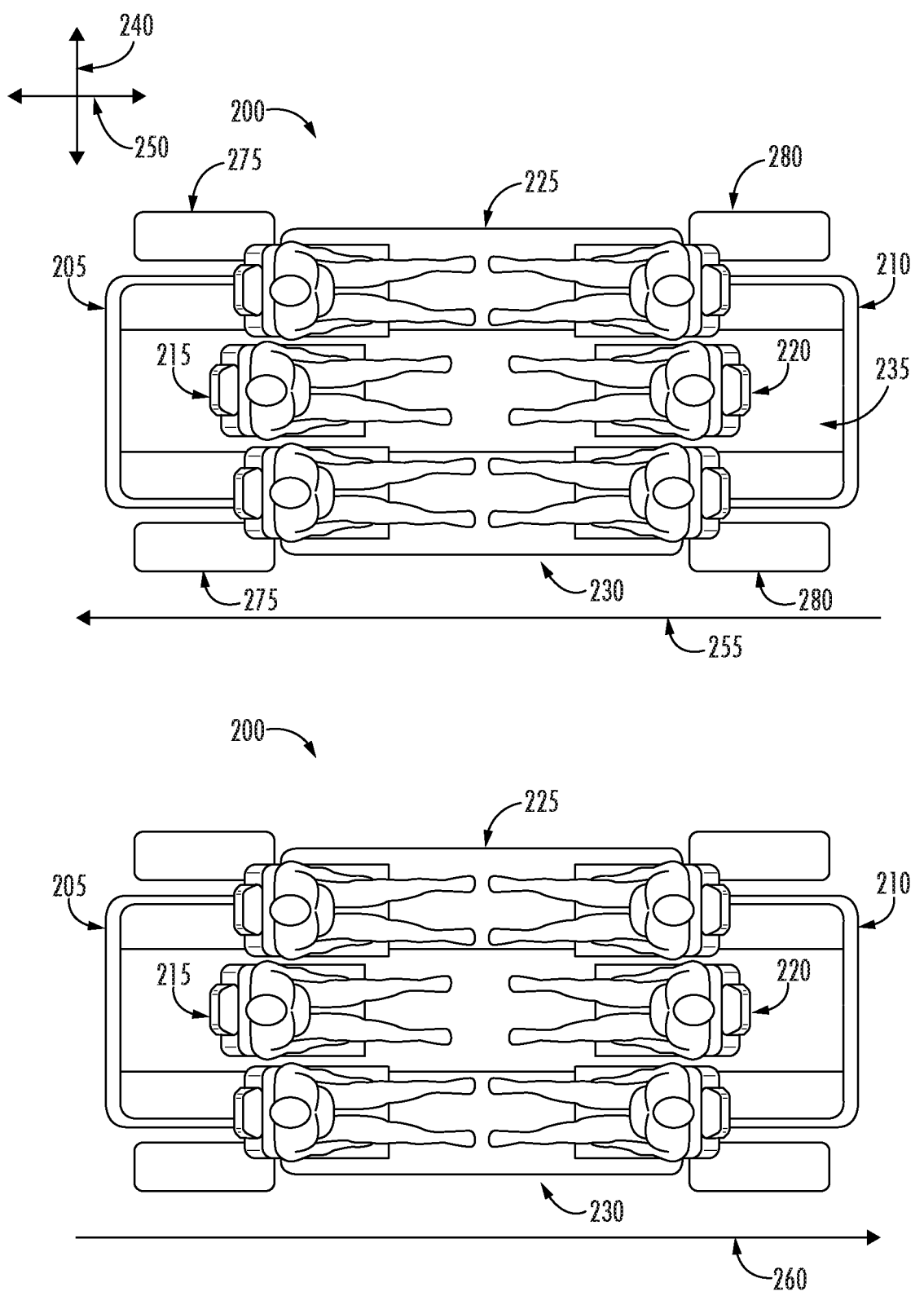
FIG. 2B depicts an example bidirectional vehicle traveling in example directions of travel according to example implementations of the present disclosure.

The autonomous vehicle 102 can include a bidirectional vehicle. For example, FIGS. 2A-B depicts an example bidirectional vehicle 200 traveling in example directions of travel 255 according to example implementations of the present disclosure. FIG. 2A depicts an example exterior view of the vehicle 200. FIG. 2B depicts an overhead view of an example vehicle interior of vehicle 200. The vehicle 200 can include a vehicle body 201 and a vehicle interior 202. For instance, the vehicle 200 can include a vehicle interior 202 defining a longitudinal direction 250, a lateral direction 240, and a vertical direction. The vehicle interior can include one or more vehicle seats 215, 220 to support one or more passengers of the vehicle 200 and/or one or more vehicle doors 225, 230 to enable the one or more passengers to enter and/or exit the vehicle interior. The one or more vehicle seats 215, 220 can be configured in one or more interior layouts.

Figure 3:
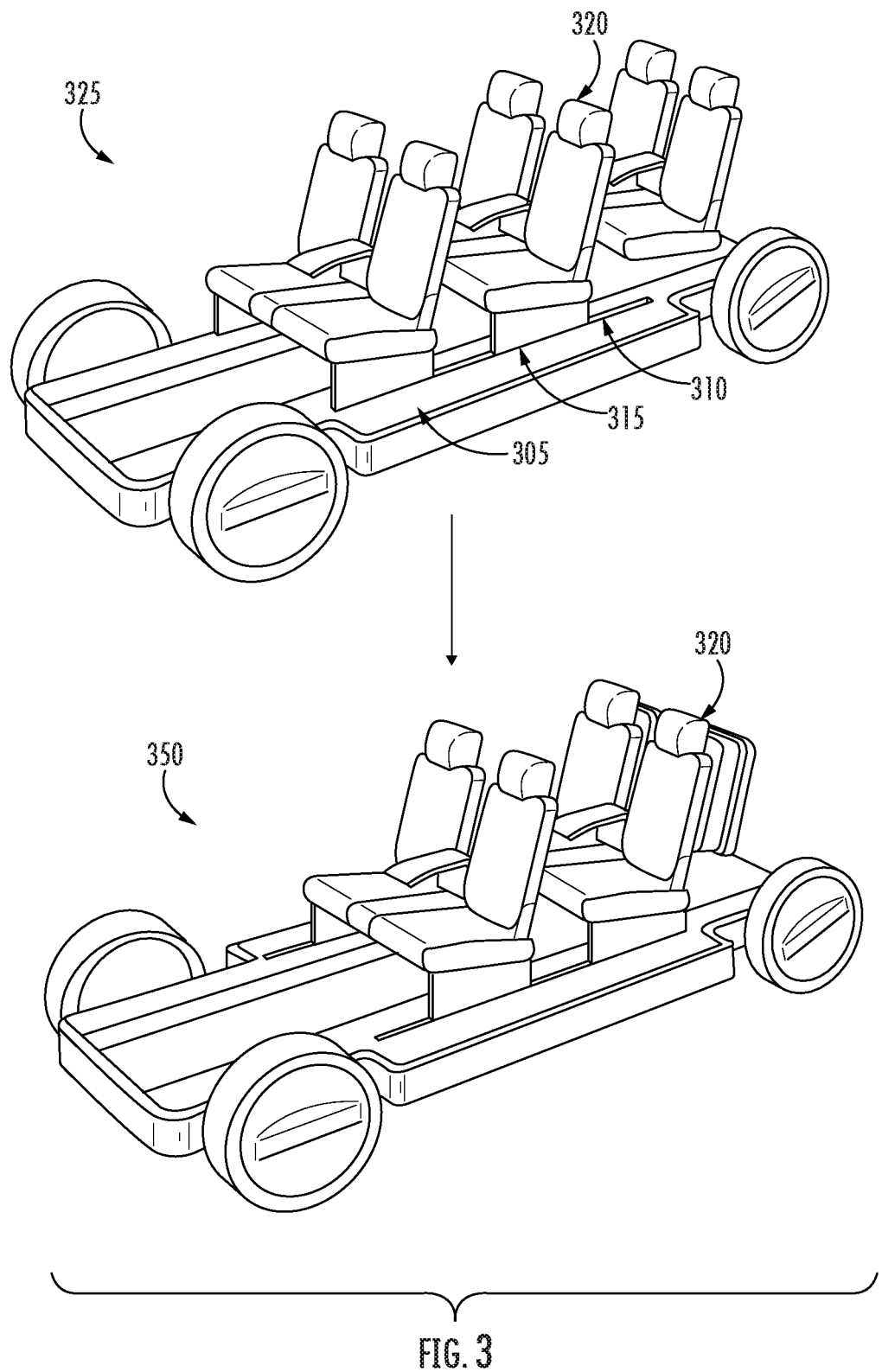
FIG. 3 depicts example interior layouts of a bidirectional vehicle according to example implementations of the present disclosure.

By way of example, FIG. 3 depicts example interior layouts of a bidirectional vehicle 200 according to example implementations of the present disclosure. As illustrated, the vehicle interior 235 of a bidirectional vehicle 200 can include a floorboard 305 with one or more mechanical components 310 (e.g., sliding tracks, spring loaded levers, locking pins, and/or other locking mechanisms, etc.) placed therein configured to couple one or more mechanical components 315 (e.g., sliding skids, wheels, spring loaded levers, locking pins, and/or any the attachment mechanisms, etc.) of the vehicle seat(s) (e.g., vehicle seat 320) to the floor 305 of the vehicle interior 300. The mechanical components 310, 315 can be placed throughout the floor 305 of the vehicle interior 300 to enable a plurality of different seat configurations 325, 350 within the vehicle 200.

The vehicle 200 can be capable of adjusting its vehicle interior 235 to provide for one or more dynamic seat reconfigurations 325, 350 to more efficiently provide a number of specialized services. More particularly, the vehicle 200 can include one or more seats (e.g., 320, etc.) that can individually or collectively be reconfigured (e.g., reconfiguration of a seat orientation and/or a seat position). As an example, a seat 320 of the vehicle 200 can change a location inside the vehicle (e.g., by sliding longitudinally along a track 310 inside the vehicle interior 235 of the vehicle 200, etc.). The vehicle 200 can include, for example, one or more motors, servos, hydraulic mechanisms, etc. that are communicatively connected to the seat(s) and the seat control system 142. The seat control system 142 can transmit control/command signal(s) to these device(s) to adjust the position of the seats in the manner described herein.

Figure 4:
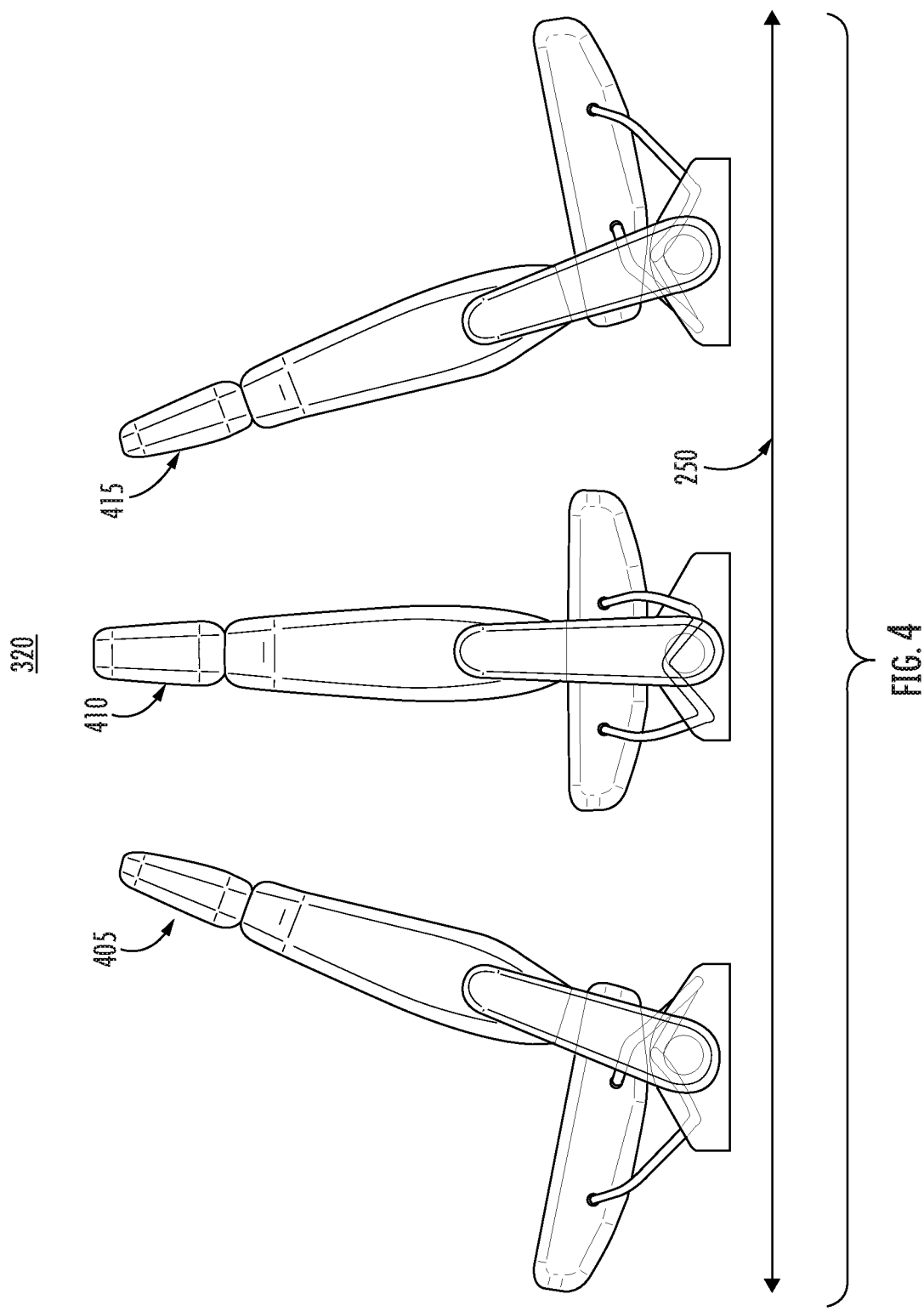
FIG. 4 depicts an example of a reconfigurable seat according to example implementations of the present disclosure.

As another example, a seat 320 of the vehicle 200 can change an orientation inside the vehicle 200. For example, FIG. 4 depicts an example of a reconfigurable seat 320 according to example implementations of the present disclosure. The reconfigurable seat 320 can face one or more directions with respect to the vehicle 200. For example, at a first orientation 405, the reconfigurable seat 320 can face a first direction along the longitudinal axis 250 that defines the vehicle interior. At a second orientation 415, the reconfigurable seat 320 can face a second (e.g., the opposite direction of the first orientation) direction along the longitudinal axis 250 that defines the vehicle interior. And, at a third orientation 410, the reconfigurable seat 320 can face the first direction, the second direction and/or neither direction along the longitudinal axis 250 that defines the vehicle interior. In addition, or alternatively, an orientation of the reconfigurable seat 320 can include fully retracting a headrest in the seat, changing an angle of the seat back of the seat, folding the seat back onto the seat base of the seat to form a table, etc. In such fashion, the seating arrangement of seats 320 in the vehicle 200 can be dynamically reconfigured to more efficiently provide a number of different services. As discussed herein, a vehicle computing system can identify a vehicle layout indicative of a seating arrangement within the vehicle interior.

Turning back to FIG. 2, the vehicle 200 can include a bidirectional vehicle that defines a longitudinal direction 250, a lateral direction 240, and a vertical direction. The vehicle 200 can have at least two ends 205, 210 spaced apart along the longitudinal direction 250. The two ends 205, 210 can include two portions of the vehicle longitudinally opposite one another. Each end can include a forward end and/or a rear end depending on the directionality of the vehicle 200. For instance, the forward end and the rear end can be defined by the direction of travel of the bidirectional vehicle 200. Moreover, each end can be substantially similar so that either end can be appropriately considered the "front" of the vehicle 200 for travelling purposes.

The two ends 205, 210 of the bi-directional vehicle 200 can be substantially the same in visual appearance and/or capability. By way of example, the vehicle 200 can include a first set of wheels 275 (e.g., one wheel, two wheels, etc.) placed proximate to a first end 205 of the vehicle 200 and a second set of wheels 280 placed proximate to a second end 210 of the vehicle 200. Each set of wheels 275, 280 can be configured to steer the vehicle 200 such that either the first end 205 or the second end 210 can act as the front/back of the vehicle 200.

For instance, the vehicle 200 can be configured travel by turning the front wheels of the vehicle 200. The vehicle can travel and/or steer in a first direction of travel 255 by turning the first set of wheels 275. In such a case, the first end 205 can be defined as the forward end of the vehicle 200 and the second end 210 can be defined as the rear end of the vehicle 200. In addition, the vehicle 200 can travel and/or steer in a second direction of travel 260 by turning the second of wheels 280. In such a case, the first end 205 can be defined as the rear end of the vehicle 200 and the second end 210 can be defined as the forward end of the vehicle 200.

In addition, or alternatively, one set of wheels 275, 280 can be configured to steer the vehicle 200. In such a case, the vehicle 200 can be front wheel steered or back wheel steered. As an example, the first set of wheels 275 can be configured to steer the vehicle 200. In such a case, the vehicle 200 can be front wheel steered while traveling in the first direction of travel 255 and back wheel steered while traveling in the second direction of travel 260. Both ends 205, 210 of the vehicle 200 can include signaling elements that would allow either end to serve as the "rear" of the vehicle (e.g., rear turn signals, brake lights, etc.) as well as the "front" of the vehicle (e.g., headlights (with brightness adjustment), daytime running lights, front turn signals, etc.). In such a case, the vehicle 200 can utilize front wheel steering when traveling in the first direction of travel 255 and rear wheel steering when traveling in the second direction of travel 260.

Figure 5:
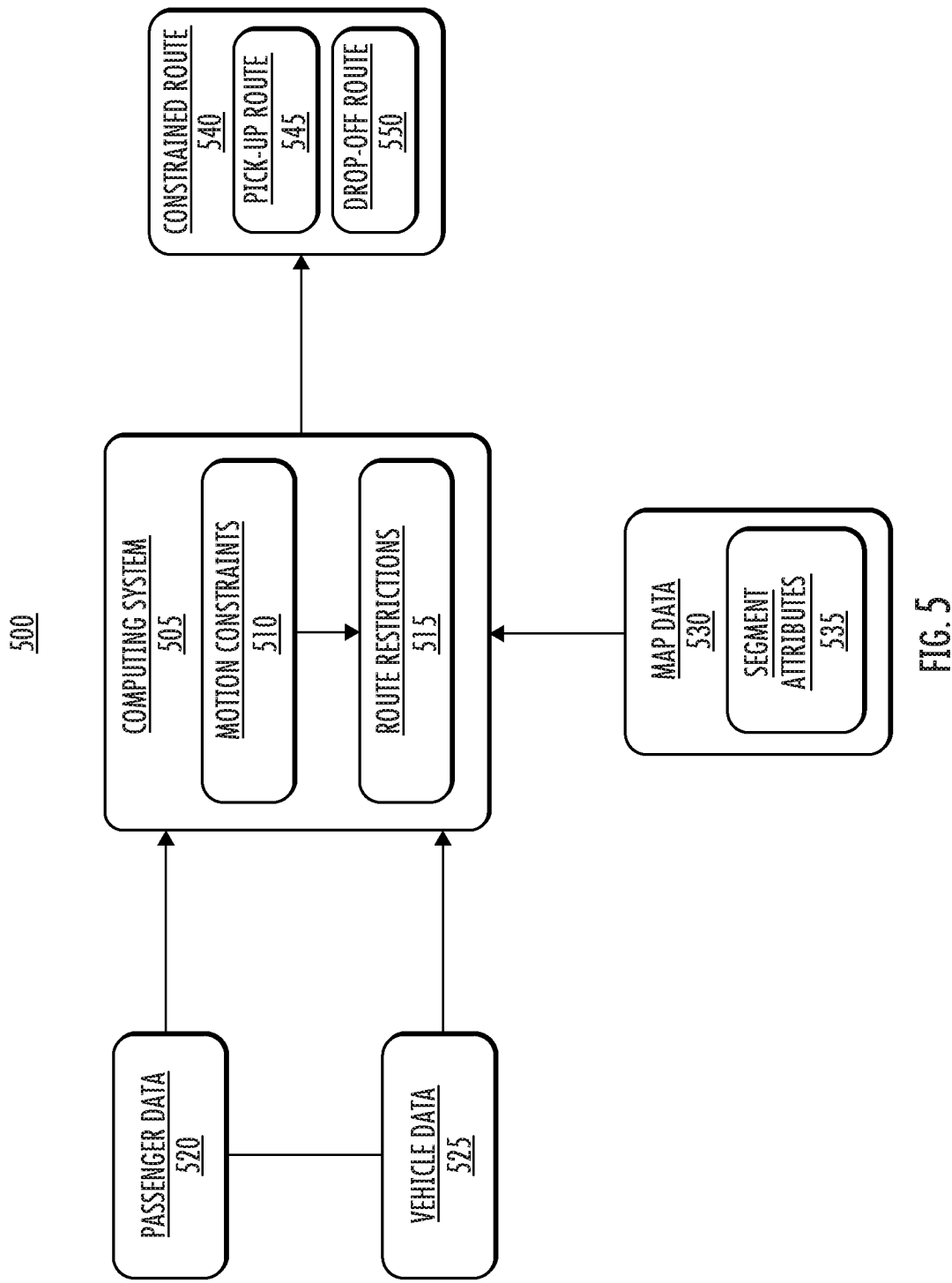
FIG. 5 depicts an example data flow diagram for generating a constrained route according to example implementations of the present disclosure.

At times, the motion of the vehicle 200 can be constrained based on the direction of travel 255, 260 of the vehicle. For example, FIG. 5 depicts an example data flow diagram 500 for generating a constrained route according to example implementations of the present disclosure. For instance, computing system 505 (e.g., a vehicle computing system 112, an operations computing system 104, etc.) can determine motion constraints 510 and/or mapping constraints 515 to constrain the movement of a vehicle based on vehicle data 525 indicative of the vehicle's orientation (e.g., as defined by the vehicle's direction of travel), passenger data 520 associated with passengers of the vehicle (e.g., a passenger's orientation relative to the vehicle and/or other passenger attributes), map data 530, and/or any other data for determining a motion of a bidirectional vehicle.

Figure 6:
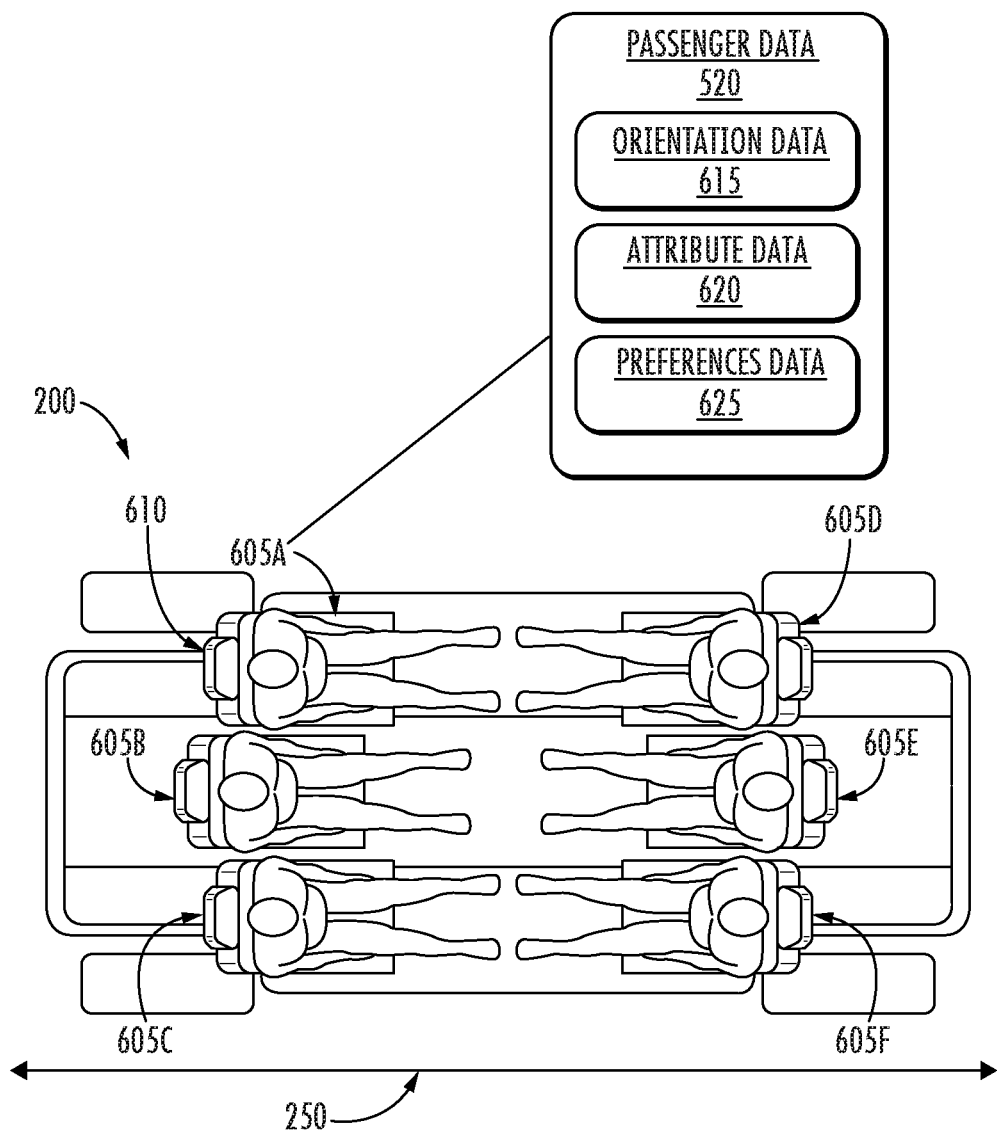
FIG. 6 depicts example passengers of an example bidirectional vehicle according to example implementations of the present disclosure.

For example, with reference to FIG. 6, the vehicle 200 can be configured to provide a transportation service for one or more passengers 605A-F of the vehicle 200. To do so, a computing system (e.g., a vehicle computing system 112, an operations computing system 104, etc.) can obtain a service request from at least one passenger 605A for a vehicle service. The service request can include and/or be associated with service request data indicating a service to be provided by the vehicle 200. For example, the service request can include a request for a transportation service from an origin location (e.g., a pickup location) and a destination location (e.g., drop-off location). The service request can include a service type (e.g., a tiered service type from premium services to pooling service, etc.), a number of passengers, and/or passenger request data for at least one of the passengers. The passenger request data, for example, can include and/or be indicative of one or more passenger preferences (e.g., preferences data 625) and/or passenger attributes (e.g., attribute data 620). For instance, the one or more passenger preferences (e.g., preference data 625) can be indicative of a seat preference, a passenger orientation preference, etc. As another example, the one or more passenger attributes (e.g., attribute data 620) can include an age, a susceptibility to motion sickness, a special accommodation (e.g., wheelchair usage, etc.), amount of luggage, and/or any other ride related attribute for a passenger 605A.

A computing system (e.g., computing system 505, vehicle computing system 112, an operations computing system 104, etc.) can assign the vehicle 200 to pick up the at least one passenger 605A at the origin location. In some implementations, the computing system can assign a seat of the vehicle to the at least one passenger based on the passenger request data.

For example, turning back to FIG. 5, the computing system 505 can obtain vehicle data 525. The vehicle data 525 can identify a vehicle layout indicative of an interior configuration of the vehicle interior and/or an occupancy of the vehicle interior. As an example, the interior configuration for the vehicle can be indicative of one or more vehicle doors and/or one or more passenger seats within the vehicle interior. For instance, the interior configuration can identify the placement of the one or more vehicle doors and/or passenger seats. In addition, the vehicle data 525 can include occupancy data that is indicative of a plurality of passengers within the vehicle. In some implementations, the occupancy data can identify the location of each passenger within the vehicle and/or the orientation of each passenger relative to the orientation of the vehicle. For example, the occupancy data can identify each of the one or more seats as occupied and/or unoccupied by a passenger of the vehicle. By way of example, the occupancy data can be determined by one or more internal vehicle sensors (e.g., internal camera, weight sensors, etc.) within the vehicle interior.

In some implementations, the computing system 505 can assign a seat of the vehicle to the at least one passenger based on the passenger request data and/or the vehicle data 525. For example, the computing system 505 can determine an assigned seat of the bidirectional vehicle for the at least one passenger based on occupancy data associated with the bidirectional vehicle and/or the one or more passenger attributes associated with the at least one passenger. As an example, the computing system 505 can assign an unoccupied seat to the passenger (e.g., as determined by the occupancy data).

In some implementations, the computing system 505 can determine a pickup route to pick up the at least one passenger based on the assigned seat. For instance, as described in further detail herein, the computing system 505 can select at least one vehicle door (e.g., a pick-up door) of the bidirectional vehicle for the at least one passenger to access the bidirectional vehicle based on the assigned seat. The pick-up door, for example, can be determined based on the position of the door relative to the seat assigned to the at least one passenger (e.g., the door closest to the assigned seat). In addition, the computing system can determine a pick-up location based on the pick-up door and/or the origin location and generate a route to the pick-up location. For instance, the route can direct the vehicle to pick-up the at least one passenger such that the assigned vehicle door is facing a curb or other safe area during the pick-up.

More particularly, the computing system 505 can be configured to generate a route to pick up the at least one passenger at or proximate to the origin location (e.g., a pick-up route 545) and drop off the at least one passenger at or proximate to the destination location (e.g., a drop-off route 550). The route can include a constrained route 540 determined based on passenger data 520, vehicle data 525, map data 530, and/or any other data associated with a transportation service. For example, the computing system 505 can obtain passenger data 520 associated with the at least one passenger, the vehicle data 525 described above, and/or map data 530 indicative of one or more route segments attributes 535.

For example, with reference to FIG. 6, the computing system 505 can obtain passenger data 520 for at least one passenger 605A of the vehicle 200. The passenger data 520, for example, can include passenger orientation data 615 and/or one or more passenger attributes (e.g., attribute data 620, preference data 625, etc.) for the at least one passenger 605A associated with the service request. The passenger orientation data 615 can be indicative of at least one of a current position, a predicted position, a current orientation and/or a predicted orientation of the at least one passenger 605A within the vehicle 200 (e.g., current location/orientation after the at least one passenger is picked up by the vehicle 200, a predicted position/orientation before the passenger is picked up by the vehicle 200, etc.). By way of example, the passenger orientation data 615 can include seat information associated with a passenger seat 610 corresponding the passenger 605A (e.g., an assigned seat, a seat occupied by the passenger, etc.). The seat information can include an orientation of the passenger seat 610 and/or the location of the passenger seat 610 relative to the vehicle 200. The passenger orientation data 615, for example, can be obtained based, at least in part on the occupancy data associated with the vehicle 200. For example, the passenger orientation data 615 can be indicative of an orientation and/or position of each of a plurality of passengers 605A-F within the vehicle 200 including the orientation and/or position of the at least one passenger 605A associated with the service request.

In addition, or alternatively, the passenger data 520 can include passenger attribute data 620 and/or passenger preference data 625. The passenger preference data 625 can identify one or more seat preferences, a passenger orientation preference, etc. for the at least one passenger 605A. The passenger attribute data 620 can identify one or more passenger attributes for the at least one passenger 605A such as, for example, a passenger age, a susceptibility to motion sickness, a handicap, an amount of luggage, and/or any other transportation related attribute for a passenger. In some implementations, the passenger attribute 620 and/or preference data 625 can be obtained based at least in part on the service request data associated with the service request received for the at least one passenger 605A. For example, the passenger data 520 can be obtained from the passenger in response to the request for the transportation service. By way of example, the passenger preference 625 and/or attribute data 620 can be obtained through user input such as, for example, via user selectable features while requesting a transportation service.

In addition, or alternatively, the at least one passenger 605A can include a user of a transportation service. For instance, the computing system 505 and/or the vehicle 200 can be associated with a transportation service provider. In such a case, the passenger preference 625 and/or attribute data 620 can include data associated with the at least one passenger 605A through a user profile and/or historical data such as, for example, one or more previous transportation services, etc. The passenger preference 625 and/or attribute data 620 can be obtained through user input such as, for example, via user selectable features while creating a user profile. In this manner, the passenger preference 625 and/or attribute data 620 can be obtained from a user profile associated with the at least one passenger 605A.

Turning back to FIG. 5, the computing system 505 can determine one or more motion constraints 510 for the vehicle 200 based on the passenger data 520. For instance, the computing system 505 can determine one or more motion constraints 510 for the bidirectional vehicle based on the passenger orientation data. In addition, or alternatively, the computing system 505 can determine one or more motion constraints 510 for the bidirectional vehicle based on the one or more passenger preferences and/or attributes. The one or more motion constraints 510 can include a speed threshold, an elevation threshold, a turning radius threshold, a directionality restraint, and/or any other restraint on the motion of the bidirectional vehicle. By way of example, a speed threshold, elevation threshold, and/or turning radius threshold can be determined for the bidirectional vehicle based on the at least one passenger's orientation with respect to the bidirectional vehicle's direction of travel. For instance, a higher speed, elevation, turning radius, etc. threshold can be determined in the event that the passenger is facing forward with respect to the bidirectional vehicle's direction of travel. As another example, a lower speed, elevation, turning radius, etc. threshold can be determined in the event that the passenger is facing backward with respect to the bidirectional vehicle's direction of travel. In this manner, a bidirectional vehicle can reduce its speed, elevation gain, or turning radius to compensate for a passenger's orientation with the bidirectional vehicle.

In addition, or alternatively, the computing system 505 can determine that the at least one passenger is associated with a motion constraint requirement based, at least in part, on the passenger data 520. A motion constraint requirement can include, for example, an age constraint, a susceptibility to motion sickness constraint, a handicap constraint, and/or any other constraint that may justify limited vehicle mobility, etc. Each motion constraint requirement, for example, can be indicative of a limiting passenger attribute/preference that can be compensated for by restricting the motion of the bidirectional vehicle. By way of example, a motion constraint requirement can indicate that a passenger suffers from motion sickness that can be compensated for (e.g., lessen severity of symptoms) by a directionality restriction on the motion of the bidirectional vehicle such that the at least one passenger is facing forward with respect to the motion of the vehicle during the transportation service.

More particularly, the computing system 505 can determine that the at least one passenger is associated with an age that achieves an age threshold. For instance, the passenger can be associated with an age under a minimum age threshold and/or over a maximum age threshold. The minimum age threshold can identify an age below which a passenger should be facing forward and/or backward (e.g., in a child seat, etc.) with respect to the direction of the vehicle. The maximum age threshold can identify an age above which a passenger should be facing forward and/or backward with respect to the direction of the vehicle. For example, passengers under and/or over an age threshold can be required to face forward and/or backward with respect to the motion of a vehicle to ensure safety and/or adhere to safety standards.

As another example, the computing system 505 can determine that the at least one passenger is associated with at least one predefined accommodation. The at least one predefined accommodation can include one of a plurality of accommodations. Each of the plurality of accommodations can identify an accommodation requiring a forward facing (and/or backward facing) orientation of a passenger. By way of example, a passenger associated with a wheelchair accommodation can be required to face forward with respect to the motion of a vehicle to ensure safety and/or adhere to safety standards. In another example, the computing system 505 can determine that a child seat is positioned within a seat of the autonomous vehicle. Such a determination can be based on sensor data acquired from interior sensors (e.g., cameras of the autonomous vehicle, weight sensors, seat belt sensors, etc.), user inputted information (e.g., a child seat request or other indication in the service request, etc.), and/or other techniques. The computing system 505 can determine that the bi-directional vehicle should be constrained to travel such that the passenger is facing rearward or forward (e.g., depending on the appropriate legal/regulatory standard for the area stored in an accessible database, user preferences, etc.). As such, motion constraints 510 can be defined to ensure that the vehicle's forward motion (e.g., high speed forward motion) allows for such a circumstance.

In addition, or alternatively, as referenced above, the computing system 505 can determine that the at least one passenger is associated with a susceptibility to motion sickness that achieves a sickness threshold. The sickness threshold can identify a level of motion sickness that can be affected by a passenger's orientation with respect to the motion of a vehicle. For example, sitting backwards (e.g., in the opposite direction of the motion of travel of the vehicle) can aggravate potential motion sickness symptoms. Therefore, a passenger associated with a susceptibility to motion sickness can be required to face forward with respect to the motion of a vehicle to ensure the comfort of the passenger. The sickness threshold can be a static sickness rating and/or a dynamic sickness rating. For instance, in some implementations, the computing system 505 can determine a sickness threshold for each predicted route to complete a transportation service. The computing system 505 can determine the sickness threshold for each route based on attributes associated with route segments (e.g., route attributes discussed in more detail herein) making up each route. For instance, rougher routes (e.g., routes with one or more potholes, higher elevation gain, steep turns, etc.) can be associated with a higher sickness threshold, whereas smoother routes (e.g., low elevation gain, no turns, newly paved, etc.) can be associated with a lower sickness threshold.

In some implementations, the computing system 505 can determine the one or more motion constraints 510 for the vehicle based, at least in part, on the one or more of the motion constraint requirements and a forward facing direction associated with the at least one passenger. For instance, the computing system 505 can determine a forward facing direction associated with the at least one passenger based, at least in part, on the passenger orientation data. The one or more motion constraints 510 can include a directionality constraint. The directionality constraint can include a restriction on the movement of the bidirectional vehicle such that the passenger orientation of the at least one passenger is in the forward facing direction relative to the movement of the vehicle. For instance, the directionality constraint can restrict the movement of the bidirectional vehicle to the forward facing direction associated with the at least one passenger. In this manner, the directionality constraint can be indicative of the forward facing direction associated with the at least one passenger. The one or more motion constraints 510 for the bidirectional vehicle can include the directionality constraint in the event the at least one passenger is associated with a motion constraint requirement. In such a case, the motion of the vehicle can be constrained to the forward facing direction of the at least one passenger.

Figure 7:
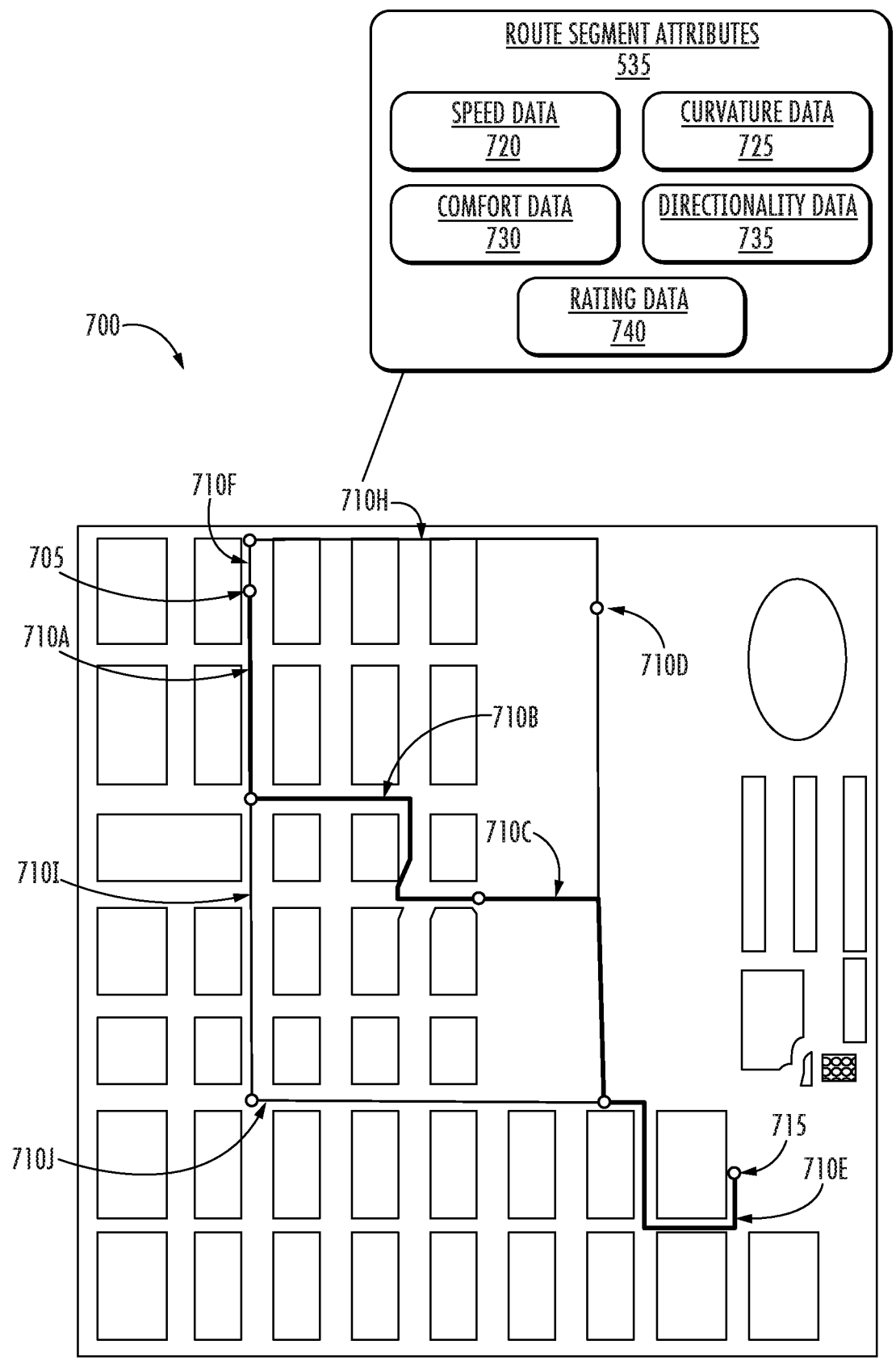
FIG. 7 depicts example route segments according to example implementations of the present disclosure.

In some implementations, the computing system 505 can obtain map data 530. The map data 530 can be indicative of one or more route segment attributes 535 for one or more of a plurality of route segments. For example, FIG. 7 depicts example route segments in an example environment 700 according to example implementations of the present disclosure. The environment 700 can include a plurality of route segments 710A-J. Each respective route segment can be associated with one or more route attributes such as, for example, route segment attributes 535 for route segment 710H. The route segment attributes 535 can include one or more passenger orientation restrictions for the at least one passenger while traveling a respective route segment 710H. By way of example, a passenger orientation restriction can require that a passenger travel along one or more route segments in a forward facing orientation with respect to the motion of the vehicle. For instance, one or more route segments along a highway or other fast and/or potentially hazardous roadway can be associated with a passenger orientation restriction to ensure passenger safety.

In addition, or alternatively, the one or more route attributes 535 for a respective route segment 710H of the plurality of route segments 710A-J can include speed data 720 indicative of a respective speed (e.g., minimum speed, maximum speed, average speed, etc.) at one or more times, a respective elevation gain (e.g., average change in elevation, highest elevation point, etc.), curvature data 725 indicative of a respective turning radius (e.g., average turning radius, sharpest turn along the route segment, etc.), comfort data 730, directionality data 735, rating data 740, and/or any other aspect associated with the respective route segment 710H. The speed data 720, for example, can be indicative of at least one of one or more speed limits or an average speed for the respective route segment 710H. The respective elevation gain can be indicative of at least one of one or more maximum elevation gains or an average elevation gain for the respective route segment 710H. And, the respective turning radius can be indicative of at least one of one or more maximum turning angles or an average turning angle for the respective route segment 710H.

In some implementations, the one or more route attributes 535 for one or more of the plurality of route segments can include one or more comfort ratings 730. The one or more comfort ratings 730, for example, can be based on historical data. For example, the computing system 505 can obtain user rating data 740 from the at least one passenger indicative of a comfort rating 730 associated with at least one route segment 710H of the plurality of route segments 710A-J. The computing system 505 can determine at least one attribute (e.g., comfort ratings 730) of the at least one route segment 710H based, at least in part, on the user rating data 740.

In addition, or alternatively, the map data 530 can be indicative of one or more safe drop off (e.g., 615) and/or pick up locations (e.g., 605). By way of example, the one or more safe drop off and/or pick up locations can include one or more roadway curbs, parking lots, medians, driveways, etc. The one or more safe drop off and/or pick up locations can include a respective side of a route segment. For instance, a route segment can be associated with one or more safe drop off and/or pick up locations along a first side (e.g., a curb side) of the route segment and/or one or more hazardous drop off and/or pick up locations along a second side (e.g., a traffic side) of the route segment.

The computing system 505 can determine one or more motion constraints 510 (e.g., vehicle orientation constraints) for the bidirectional vehicle based, at least in part, on the vehicle layout, the passenger orientation data, and/or the map data 530. For instance, the one or more motion constraints 510 can include a pick-up and/or drop-off vehicle orientation constraint indicative of a vehicle orientation at a pick-up location 705 and/or a drop off location 715. The vehicle orientation, for example, can identify an orientation of the bidirectional vehicle with respect to one or more route segments 710A-J. For example, a vehicle orientation can identify a side and/or door of the bidirectional vehicle that faces a first and/or second side of a respective route segment 710H.

By way of example, as referenced above, the computing system 505 can select a vehicle door of the one or more vehicle doors of the bidirectional vehicle to facilitate the ingress and/or egress of at least one passenger to the bidirectional vehicle. The vehicle door can be selected based on the vehicle layout and/or the passenger orientation data. For example, the vehicle door can be within a proximity threshold to the at least one passenger. By way of example, the vehicle door can be selected based, at least in part, on the position of the at least one passenger with respect to a plurality of other passengers of the bidirectional vehicle. For instance, the vehicle door can be selected such that the at least one passenger can enter and/or exit the vehicle with minimal interference to the plurality of other passengers. The computing system 505 can determine at least one vehicle orientation constraint based, at least in part, on the vehicle door and at least one of the one or more safe drop off and/or pick up locations associated with a route segment 710A-J. For example, the at least one vehicle orientation constraint can be indicative of the vehicle door facing a safe drop off and/or pick up location (e.g., a roadway curb).

Turning back to FIG. 5, the computing system 505 can determine one or more map constraints 515 based on the passenger data 520, the map data 530, and/or the one or more motion constraints 510. The one or more map constraints 515, for example, can be indicative of one or more restricted route segments of the plurality of route segments (e.g., route segments 710A-J of FIG. 7). In some implementations, the one or more restricted route segments can be associated with at least one passenger orientation restriction. For instance, one or more route segments associated with a passenger orientation restriction that requires passengers of vehicle to face forward with respect to motion of the bidirectional vehicle can be restricted in the event that one or more passengers of the bidirectional vehicle are facing opposite to the direction of travel.

In addition, or alternatively, the one or more map constraints 515 can be based, at least in part, on one or more other motion constraints 510 such as, for example, a speed constraint, elevation constraint, turning radius constraint, etc. For instance, one or more of the restricted route segments can be associated with at least one of a restricted speed that achieves a speed threshold, a restricted elevation gain that achieves an elevation gain threshold, a restricted turning radius that achieves a turning radius threshold, etc. By way of example, the speed threshold, elevation gain, and/or turning radius threshold can depend on the passenger data 520 associated with the at least one passenger. For instance, a speed, elevation, and/or turning radius threshold can depend on passenger attributes such that, for example, a threshold can be lower for a passenger who suffers from motion sickness than for a passenger who does not. In addition, the speed, elevation, and/or turning radius thresholds can depend on the passenger orientation of the at least one passenger. For instance, a threshold can be lower for a passenger facing opposite the direction of travel of the bidirectional vehicle, than a threshold for a passenger in a forward facing orientation with respect to the direction of travel of the bidirectional vehicle. In this manner, map constraints 515 can restrict rougher route segments in the event that a passenger is facing opposite the direction of travel.

Moreover, in some implementations, the one or more restricted route segments can include one or more route segments associated with a comfort rating that fails to achieve a minimum comfort rating associated with the at least one passenger. For example, the computing system 505 can determine a minimum comfort rating for the at least one passenger based, at least in part, on the one or more passenger attributes associated with the at least one passenger. For instance, a passenger attribute can include minimum comfort preference, etc. By way of example, a request for the transportation service can include a requested comfort level.

The computing system 505 can generate a constrained route 540 for the bidirectional vehicle based, at least in part, on the one or more motion 510 and/or map constraints 515. For example, the constrained route 540 can include a route in the forward facing direction associated with the at least one passenger in the event that the at least one passenger is associated with a motion constraint requirement (e.g., motion sickness, age, etc.). In addition, or alternatively, the constrained route 540 can include one or more unrestricted route segments different than the restricted route segments. The unrestricted route segments, for example, can include route segments that achieve any map constraints 515 determined for the transportation service (and/or the at least one passenger).

The constrained route 540 can include a pick-up route 545 and/or a drop off route 550. The computing system 505 can determine the pick-up route 545 by determining a safe pick-up location based on the map data 530, the origin location, and/or an assigned/predicted seat for the at least one passenger. The pick-up route 545 can include one or more unrestricted route segments determined based on the passenger data 520 (e.g., passenger orientation, attributes, preferences, etc.) associated with one or more passengers within the bidirectional vehicle during the pick-up route 545.

In addition, the computing system can determine a drop off route 550 by determining a safe drop off location. The safe drop off location can be determined based, at least in part, on at least one roadway curb associated with a route segment within a proximity to the destination location. The drop off route 550 can include one or more unrestricted route segments determined based on the passenger data 520 (e.g., passenger orientation, attributes, preferences, etc.) associated with the at least one passenger and/or one or more other passengers within the bidirectional vehicle during the drop off route 550. In addition, the computing system 505 can generate the constrained route 540 to the drop off location based, at least in part, on a vehicle orientation determined for the drop off location. The constrained route 540, for example, can direct the bidirectional vehicle to reach the drop off location at the at least one vehicle orientation.

In some implementations, the computing system 505 can obtain a drop off schedule indicative of an order to drop off each a plurality of passengers of the bidirectional vehicle (e.g., where the bidirectional vehicle is configured to provide a car pooling service). In such a case, the computing system 505 can determine the drop off route 550 based on the drop off schedule. For instance, the drop off route 550 can include one or more drop off locations along the drop off route 550. In some implementations, the occupancy data (e.g., the passenger orientation data for each of the passengers within the bidirectional vehicle) can be determined during the drop off route 550 after reaching each drop off location. In such a case the computing system 505 can select a vehicle door and, accordingly, another drop-off location and/or vehicle orientation for the at least one passenger to exit the vehicle based, at least in part, on the drop off schedule. For instance, the vehicle door can change depending on the presence and/or absence of other passengers between the at least one passenger and the one or more vehicle doors of the bidirectional vehicle. In this manner, a drop off route 550 can be determined based, at least in part, on a drop off schedule.

The computing system 505 can initiate a motion of the bidirectional vehicle based, at least in part, on the constrained route 540. For example, the computing system 505 can include a transportation services system (e.g., an operations computing system 104) communicatively connected to one or more onboard computing systems (e.g., the vehicle computing system 112) of the bidirectional vehicle. The computing system 505 can provide the constrained route 540 and/or one or more command instructions for initiating the constrained route 540 to the bidirectional vehicle. The bidirectional vehicle can receive data indicative of the constrained route 540 and/or the one or more command instructions and, in response, can initiate a motion of the vehicle in accordance with the constrained route 540.

By way of example, the bidirectional vehicle can be configured to generate a motion plan and/or one or more vehicle trajectories for traveling in accordance with the constrained motion plan. For instance, the bidirectional vehicle can include a motion planning system (e.g., motion planning system 128 of FIG. 1) configured to generate a motion plan for the autonomous vehicle. The motion planning system can obtain a plurality of trajectories, determine a cost for each trajectory based on one or more weighted cost functions, and determine an optimal trajectory for the bidirectional vehicle based on the cost. In some implementations, the motion and/or map constraints can include highly weighted cost functions such that the motion planning system can determine an optimal trajectory for the bidirectional vehicle that does not violate any of the motion and/or map constraints unless an emergency situation exists that outweighs the cost of violating the motion and/or map constraints.

In addition, or alternatively, the vehicle can include and/or be associated with a routing system (e.g., an onboard routing system, a remote routing system, etc.) configured to determine a route for the vehicle between one or more pick-up location(s) and drop-off location(s). The routing system can be configured to obtain one or more potential route(s) for the vehicle and analyze each potential route to determine whether the potential route violates any of the motion and/or map constraints. The routing system can determine a route for the vehicle to follow from the one or more potential routes that does not violate any of the motion and/or map constraints. By way of example, the routing system can choose a route for the vehicle to follow that includes permitted route segments and/or a direction of travel such that the vehicle arrives at a pick-up/drop-off location with a pick-up/drop-off door facing a safe area of the pick-up/drop-off location.

Figure 8:
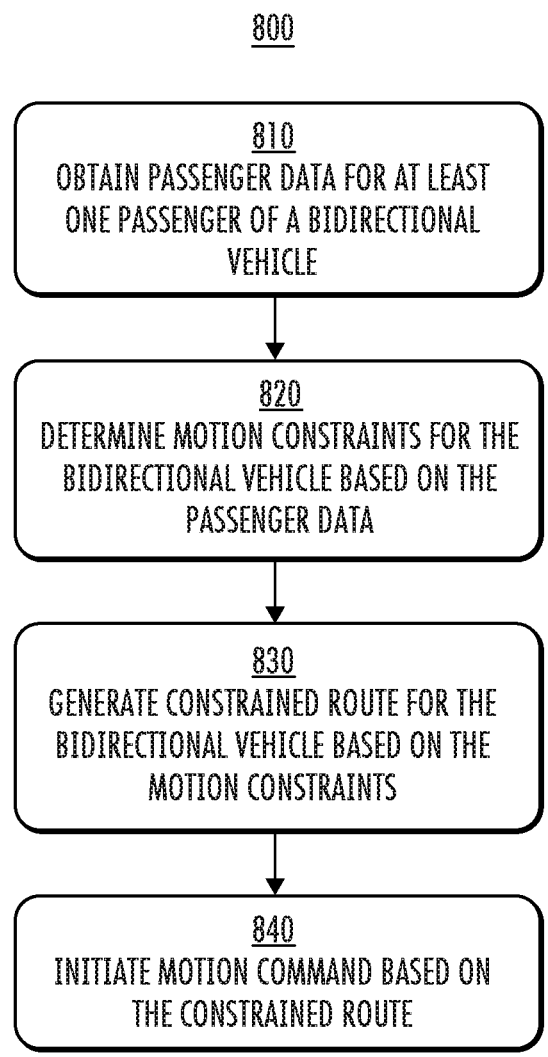
FIG. 8 depicts a flowchart of a method for generating a constrained route according to aspects of the present disclosure.

Turning to FIG. 8, FIG. 8 depicts a flowchart of a method 800 for generating a constrained route according to aspects of the present disclosure. One or more portion(s) of the method 800 can be implemented by a computing system that includes one or more computing devices such as, for example, the computing systems described with reference to the other figures (e.g., the computing system 505, operations computing system 104, vehicle computing system 112, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1-4, 10, 11, etc.), for example, to control the motion of an autonomous vehicle (e.g., by generating a constrained route/motion). FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At 810, the method 800 can include obtaining passenger data. For example, a computing system (e.g., computing system 505, operations computing system 104, etc.) can obtain passenger orientation data for at least one passenger of a bidirectional vehicle. The passenger orientation data can be indicative of at least one of a position and/or an orientation of the at least one passenger within the bidirectional vehicle. In addition, or alternatively, the passenger orientation data can be indicative of a plurality of passengers within the bi-directional vehicle. In some implementations, the passenger orientation can include vehicle sensors.

For example, the bidirectional vehicle can define a longitudinal direction, a lateral direction, and a vertical direction and have at least two ends spaced apart along the longitudinal direction. The two ends can include a forward end and a rear end. The forward end and the rear end can be defined by the direction of travel of the bidirectional vehicle. The computing system can obtain a request for a transportation service to transport a passenger from an origin location to a destination location via the bidirectional vehicle. The passenger data can be associated with the passenger to be transported.

At 820, the method 800 can include determining motion constraints. For example, a computing system (e.g., computing system 505, operations computing system 104, etc.) can determine one or more motion constraints for the bidirectional vehicle based, at least in part, on the passenger data (e.g., passenger orientation data). The one or more motion constraints can include a directionality constraint that restricts the movement of the bidirectional vehicle. The directionality constraint can be indicative of the forward facing direction associated with the at least one passenger.

In some implementations, the computing system can obtain passenger data indicative of one or more passenger attributes associated with the at least one passenger. The passenger attribute(s) can include at least one of an age, a susceptibility to motion sickness, an accommodation, and/or luggage. The computing system can determine the one or more motion constraints for the bidirectional vehicle based, at least in part, on the passenger data.

For example, the computing system can determine that the at least one passenger is associated with a motion constraint requirement based, at least in part, on the passenger data. The computing system can determine a forward facing direction associated with the at least one passenger based, at least in part, on the passenger orientation data. The computing system can determine the one or more motion constraints for the bidirectional vehicle based, at least in part, on the motion constraint requirement and the forward facing direction associated with the at least one passenger.

A motion constraint requirement can include at least one of an age constraint, a susceptibility to motion sickness constraint, and/or a handicap constraint. The computing system can determine that the at least one passenger is associated with the motion constraint requirement by determining that the at least one passenger is associated with an age that achieves a minimum age threshold or a maximum age threshold, determining that the at least one passenger is associated with a susceptibility to motion sickness that achieves a sickness threshold, and/or determining that the at least one passenger is associated with at least one predefined accommodation.

In some implementations, the one or more motion constraints can include one or more vehicle orientation constraints. Each vehicle orientation constraint can be indicative of a vehicle orientation at one or more locations. For example, the bidirectional vehicle can be associated with a vehicle layout indicative of one or more vehicle doors. The computing system can determine the one or more vehicle orientation constraints for the bidirectional vehicle based, at least in part, on the vehicle layout and the passenger orientation data. For instance, the computing system can obtain map data indicative of one or more drop off locations.

The computing system can select a vehicle door of the one or more vehicle doors based, at least in part, on the vehicle layout and the passenger orientation data. The vehicle door can be selected based, at least in part, on the position of the at least one passenger with respect to the plurality of passengers. The vehicle door, for example, can be within a proximity threshold to the at least one passenger. The computing system can determine at least one vehicle orientation based, at least in part, on the vehicle door and at least one of the one or more drop off locations. The one or more drop off locations, for example, can include one or more roadway curbs and the at least one vehicle orientation can be indicative of the vehicle door facing the at least one roadway curb.

At 830, the method 800 can include generating a constrained route. For example, a computing system (e.g., computing system 505, operations computing system 104, etc.) can generate a constrained route for the bidirectional vehicle based, at least in part, on the one or more motion constraints and/or an origin location or destination location. The constrained route can include a route in the forward facing direction associated with the at least one passenger. In addition, or alternatively, the computing system can a determine a drop off location based, at least in part, on at least one roadway curb and generate the constrained route to the drop off location based, at least in part, on the vehicle orientation. The constrained route can direct the bidirectional vehicle to reach the drop off location with the vehicle orientation.

In some implementations, the constrained route can include a pickup route. In such a case, the computing system can determine an assigned seat for the at least one passenger based on the passenger attribute data and occupancy data indicative of the one or more passengers within the bidirectional vehicle.

The computing system can determine a pick-up door of the bidirectional vehicle for the at least one passenger to access the bidirectional vehicle based, at least in part, on the assigned seat. And, the computing system can determine the pick-up location based, at least in part, on the pick-up door and the origin location. The computing system can generate the constrained route for the bidirectional vehicle based, at least in part, on the pick-up location and the pick-up vehicle orientation.

At 840, the method 800 can include initiating a motion command. For example, a computing system (e.g., computing system 505, operations computing system 104, etc.) can initiate a motion of the bidirectional vehicle based, at least in part, on the constrained route. To do so, for instance, the vehicle computing system can inform a motion planning system of the constrained route so that the motion planning system can iteratively generate trajectories for the autonomous vehicle along the constrained route such that the vehicle's motion will not violate any of the determined constraint(s).

Figure 9:
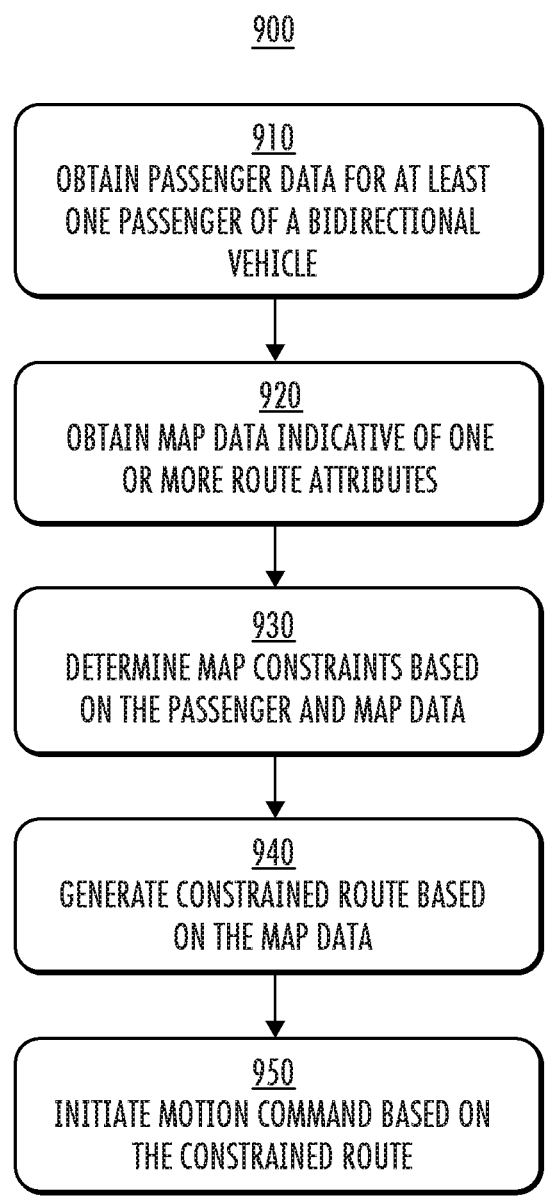
FIG. 9 depicts a flowchart of another method for generating a constrained route according to aspects of the present disclosure.

Turning to FIG. 9, FIG. 9 depicts a flowchart of another method 900 for generating a constrained route according to aspects of the present disclosure. One or more portion(s) of the method 900 can be implemented by a computing system that includes one or more computing devices such as, for example, the computing systems described with reference to the other figures (e.g., the computing system 505, operations computing system 104, vehicle computing system 112, etc.). Each respective portion of the method 900 can be performed by any (or any combination) of one or more computing devices. Moreover, one or more portion(s) of the method 900 can be implemented as an algorithm on the hardware components of the device(s) described herein (e.g., as in FIGS. 1-4, 10, 11, etc.), for example, to control vehicle motion (e.g., via a constrained route). FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 9 is described with reference to elements/terms described with respect to other systems and figures for exemplary illustrated purposes and is not meant to be limiting. One or more portions of method 900 can be performed additionally, or alternatively, by other systems.

At 910, the method 900 can include obtaining passenger data. For example, a computing system (e.g., computing system 505, operations computing system 104, etc.) can obtain passenger data for at least one passenger of a bidirectional autonomous vehicle. The passenger data can be indicative of a passenger orientation associated with the at least one passenger. For instance, the computing system can obtain a request for a transportation service to transport at least one passenger from an origin location to a destination location. The request can include the passenger data.

At 920, the method 900 can include obtaining map data. For example, a computing system (e.g., computing system 505, operations computing system 104, etc.) can obtain map data indicative of one or more route attributes for one or more of a plurality of route segments. The one or more route attributes can include one or more passenger orientation restrictions for the at least one passenger.

At 930, the method 900 can include determining map constraints. For example, a computing system (e.g., computing system 505, operations computing system 104, etc.) can determine one or more map constraints based, at least in part, on the passenger data and the map data. The one or more map constraints can be indicative of one or more restricted route segments of the plurality of route segments. The one or more restricted route segments can be associated with at least one passenger orientation restriction.

At 940, the method 900 can include generating a constrained route. For example, a computing system (e.g., computing system 505, operations computing system 104, etc.) can generate a constrained route based, at least in part, on the one or more map constraints. The constrained route can include one or more unrestricted route segments different than the restricted route segments.

At 950, the method 900 can include initiating a motion command. For example, a computing system (e.g., computing system 505, operations computing system 104, etc.) can initiate a motion command based on the constrained route. For instance, the computing system can initiate a constrained motion plan for the autonomous vehicle based, at least in part, on the one or more motion constraints. The constrained route can include one or more unrestricted route segments different than the restricted route segments.

Figure 10:
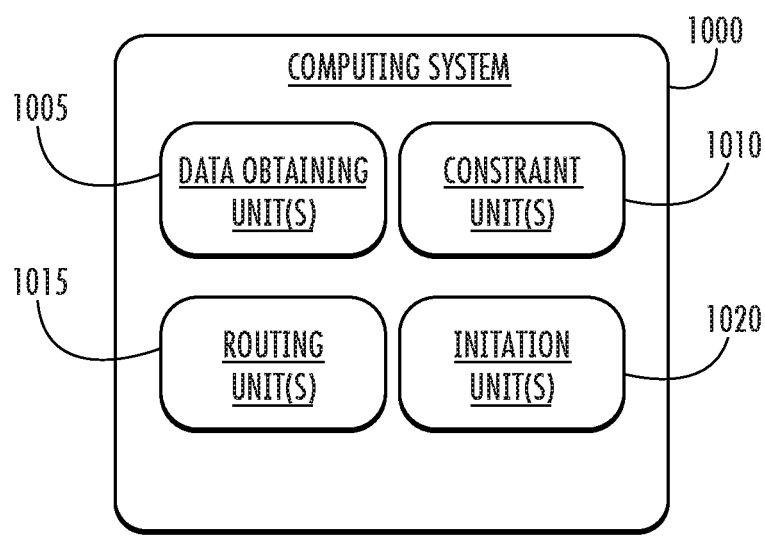
FIG. 10 depicts example units associated with a computing system for performing operations and functions according to example embodiments of the present disclosure.

FIG. 10 depicts an example computing system 1000 with various means for performing operations and functions according example implementations of the present disclosure. One or more operations and/or functions in FIG. 10 can be implemented and/or performed by one or more devices (e.g., one or more computing devices of the operations computing system 104) or systems including, for example, the operations computing system 104, the computing system 505, which are shown in FIGS. 1 and 5.

Various means can be configured to perform the methods and processes described herein. For example, a computing system 1000 can include data obtaining unit(s) 1005, constraint unit(s) 1010, routing unit(s) 1015, initiation unit(s) 1020, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., data obtaining unit(s) 1005, etc.) can be configured to obtain passenger orientation data for at least one passenger of a bidirectional vehicle. The passenger orientation data can be indicative of at least one of a position or an orientation of the at least one passenger within the bidirectional vehicle. In addition, the means (e.g., data obtaining unit(s) 1005, etc.) can be configured to obtain map data indicative of one or more route attributes for one or more of a plurality of route segments. The one or more route attributes can include one or more passenger orientation restrictions for the at least one passenger.

The means (e.g., constraint unit(s) 1010, etc.) can be configured to determine one or more motion constraints for the bidirectional vehicle based, at least in part, on the passenger orientation data. In addition, the means (e.g., constraint unit(s) 1010, etc.) can be configured to determine one or more map constraints based, at least in part, on the passenger data and the map data. The one or more map constraints can be indicative of one or more restricted route segments of the plurality of route segments. The one or more restricted route segments can be associated with at least one passenger orientation restriction.

The means (e.g., routing unit(s) 1015, etc.) can be configured to generate a constrained route for the bidirectional vehicle based, at least in part, on the one or more motion constraints. In addition, the means (e.g., routing unit(s) 1015, etc.) can be configured to generate a constrained route based, at least in part, on the one or more map constraints. The constrained route can include one or more unrestricted route segments different than the restricted route segments. The means (e.g., initiation unit(s) 1020, etc.) can be configured to initiate a motion of the bidirectional vehicle based, at least in part, on the constrained route.

Figure 11:
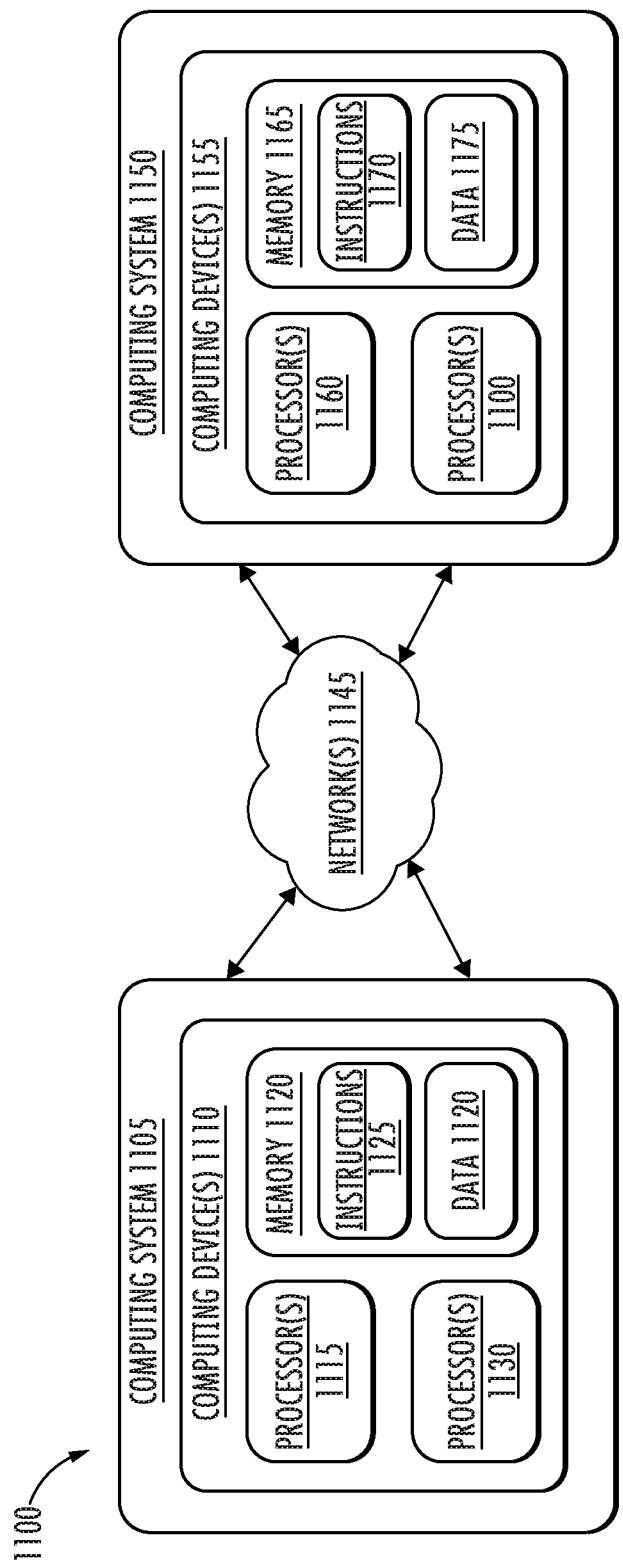
FIG. 11 depicts a block diagram of example computing hardware according to example embodiments of the present disclosure.

FIG. 11 depicts example system components of an example system 1100 according to example embodiments of the present disclosure. The example system 1100 can include the computing system 1105 (e.g., a vehicle computing system 112, computing system 705, etc.) and the computing system(s) 1150 (e.g., computing system 505, operations computing system 104, etc.), etc. that are communicatively coupled over one or more network(s) 1145.

The computing system 1105 can include one or more computing device(s) 1110. The computing device(s) 1110 of the computing system 1105 can include processor(s) 1115 and a memory 1120. The one or more processors 1115 can be any suitable processing device (e.g., a processor core, a microprocessor, an ASIC, a FPGA, a controller, a microcontroller, etc.) and can be one processor or a plurality of processors that are operatively connected. The memory 1120 can include one or more non-transitory computer-readable storage media, such as RAM, ROM, EEPROM, EPROM, one or more memory devices, flash memory devices, etc., and combinations thereof.

The memory 1120 can store information that can be accessed by the one or more processors 1115. For instance, the memory 1120 (e.g., one or more non-transitory computer-readable storage mediums, memory devices) can include computer-readable instructions 1125 that can be executed by the one or more processors 1115. The instructions 1125 can be software written in any suitable programming language or can be implemented in hardware. Additionally, or alternatively, the instructions 1125 can be executed in logically and/or virtually separate threads on processor(s) 1115.

For example, the memory 1120 can store instructions 1125 that when executed by the one or more processors 1115 cause the one or more processors 1115 to perform operations such as any of the operations and functions for which the computing systems (e.g., computing system 705, vehicle computing system 111) are configured, as described herein.

The memory 1120 can store data 1130 that can be obtained, received, accessed, written, manipulated, created, and/or stored. The data 1130 can include, for instance, passenger data, vehicle data, map data, and/or other data/information described herein. In some implementations, the computing device(s) 1110 can obtain from and/or store data in one or more memory device(s) that are remote from the computing system 1105 such as one or more memory devices of the computing system 1150.

The computing device(s) 1110 can also include a communication interface 1135 used to communicate with one or more other system(s) (e.g., computing system 1150). The communication interface 1135 can include any circuits, components, software, etc. for communicating via one or more networks (e.g., 1145). In some implementations, the communication interface 1135 can include for example, one or more of a communications controller, receiver, transceiver, transmitter, port, conductors, software and/or hardware for communicating data/information.

The computing system 1150 can include one or more computing devices 1155. The one or more computing devices 1155 can include one or more processors 1160 and a memory 1165. The one or more processors 1160 can be any suitable processing device (e.g., a processor core, a microprocessor, an ASIC, a FPGA, a controller, a microcontroller, etc.) and can be one processor or a plurality of processors that are operatively connected. The memory 1165 can include one or more non-transitory computer-readable storage media, such as RAM, ROM, EEPROM, EPROM, one or more memory devices, flash memory devices, etc., and combinations thereof.

The memory 1165 can store information that can be accessed by the one or more processors 1160. For instance, the memory 1165 (e.g., one or more non-transitory computer-readable storage mediums, memory devices) can store data 1175 that can be obtained, received, accessed, written, manipulated, created, and/or stored. The data 1175 can include, for instance, passenger data, vehicle data, map data, and/or other data/information described herein. In some implementations, the computing system 1150 can obtain data from one or more memory device(s) that are remote from the computing system 1150.

The memory 1165 can also store computer-readable instructions 1170 that can be executed by the one or more processors 1160. The instructions 1170 can be software written in any suitable programming language or can be implemented in hardware. Additionally, or alternatively, the instructions 1170 can be executed in logically and/or virtually separate threads on processor(s) 1160. For example, the memory 1165 can store instructions 1170 that when executed by the one or more processors 1160 cause the one or more processors 1160 to perform any of the operations and/or functions described herein, including, for example, any of the operations and functions of the devices described herein, and/or other operations and functions.

The computing device(s) 1155 can also include a communication interface 1180 used to communicate with one or more other system(s). The communication interface 1180 can include any circuits, components, software, etc. for communicating via one or more networks (e.g., 1145). In some implementations, the communication interface 1180 can include for example, one or more of a communications controller, receiver, transceiver, transmitter, port, conductors, software and/or hardware for communicating data/information.

The network(s) 1145 can be any type of network or combination of networks that allows for communication between devices. In some embodiments, the network(s) 1145 can include one or more of a local area network, wide area network, the Internet, secure network, cellular network, mesh network, peer-to-peer communication link and/or some combination thereof and can include any number of wired or wireless links. Communication over the network(s) 1145 can be accomplished, for instance, via a network interface using any type of protocol, protection scheme, encoding, format, packaging, etc.

FIG. 11 illustrates one example system 1100 that can be used to implement the present disclosure. Other computing systems can be used as well. Computing tasks discussed herein as being performed at a cloud services system can instead be performed remote from the cloud services system (e.g., via aerial computing devices, robotic computing devices, facility computing devices, etc.), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
    obtaining, by a computing system comprising one or more computing devices, passenger data for at least one passenger of a bidirectional autonomous vehicle, wherein the passenger data is indicative of a passenger orientation associated with the at least one passenger;
    obtaining, by the computing system, map data indicative of one or more route attributes for one or more of a plurality of route segments, wherein the one or more route attributes comprise one or more passenger orientation restrictions for the at least one passenger;
    determining, by the computing system, one or more map constraints based, at least in part, on the passenger data and the map data, wherein the one or more map constraints are indicative of one or more restricted route segments of the plurality of route segments, wherein the one or more restricted route segments are associated with at least one passenger orientation restriction; and
    generating, by the computing system, a constrained route based, at least in part, on the one or more map constraints, wherein the constrained route comprises one or more unrestricted route segments different than the restricted route segments; and
    initiating, by the computing system, a motion for the bidirectional autonomous vehicle based, at least in part, on the constrained route.

2. The computer-implemented method of claim 1, wherein the bidirectional autonomous vehicle defines a longitudinal direction, a lateral direction, and a vertical direction, and has at least two ends spaced apart along the longitudinal direction, wherein the two ends comprise a forward end and a rear end, and wherein the forward end and the rear end are defined by the direction of travel of the bidirectional vehicle.

3. The computer-implemented method of claim 1, wherein the passenger data is indicative of one or more passenger attributes associated with the at least one passenger, and wherein the one or more passenger attributes associated with the at least one passenger comprise at least one of an age, a seat preference, a susceptibility to motion sickness, a handicap, or luggage.

4. The computer-implemented method of claim 3, further comprising:
    determining, by the computing system, one or more motion constraints for the bidirectional autonomous vehicle based, at least in part, on the one or more passenger attributes associated with the at least one passenger; and
    determining, by the computing system, the one or more map constraints based, at least in part, on the one or more motion constraints.

5. The computer-implemented method of claim 4, wherein determining the one or more motion constraints comprise:
    determining, by the computing system, that the at least one passenger is associated with a motion constraint requirement based, at least in part, on the passenger data; and
    determining, by the computing system, the one or more motion constraints for the bidirectional autonomous vehicle based, at least in part, on the motion constraint requirements.

6. The computer-implemented method of claim 5, wherein the one or more motion constraints comprise at least one of a speed threshold, an elevation threshold, or a turning radius threshold.

7. The computer-implemented method of claim 6, wherein the one or more route attributes of a respective route segment of the plurality of route segments comprise a speed, an elevation gain, or a turning radius associated with the respective route segment.

8. The computer-implemented method of claim 7, wherein:
    the respective speed is indicative of at least one of one or more speed limits or an average speed for the respective route segment,
    the respective elevation gain is indicative of at least one of one or more maximum elevation gains or an average elevation gain for the respective route segment, or
    the respective turning radius is indicative of at least one of one or more maximum turning angles or an average turning angle for the respective route segment.

9. The computer-implemented method of claim 7, wherein each of the one or more restricted route segments is associated with at least one of a respective speed that achieves the speed threshold, a respective elevation gain that achieves the elevation gain threshold, or a respective turning radius that achieves the turning radius threshold.

10. The computer-implemented method of claim 1, wherein the one or more route attributes for one or more of the plurality of route segments comprise one or more comfort ratings.

11. The computer-implemented method of claim 10, further comprising:
determining, by the computing system, a minimum comfort rating for the at least one passenger based, at least in part, on the one or more passenger attributes associated with the at least one passenger.

12. The computer-implemented method of claim 11, wherein the one or more restricted route segments comprise one or more route segments associated with a comfort rating that fails to achieve the minimum comfort rating.

13. The computer-implemented method of claim 11, further comprising:
obtaining, by the computing system, user rating data from the at least one passenger indicative of a comfort rating associated with at least one route segment of the plurality of route segments.

14. The computer-implemented method of claim 13, further comprising:
determining, by the computing system, at least one attribute of the at least one route segment based, at least in part, on the user rating data.

15. A computing system comprising:
one or more processors; and
one or more non-transitory computer-readable media that collectively store instructions that, when executed by the one or more processors, cause the system to perform operations, the operations comprising:
obtaining a request for a transportation service to transport at least one passenger from an origin location to a destination location;
obtaining passenger data for the at least one passenger, wherein the passenger data is indicative of a passenger orientation associated with the at least one passenger;
obtaining map data indicative of one or more route attributes for one or more of a plurality of route segments, wherein the one or more route attributes comprise one or more passenger orientation restrictions for the at least one passenger;
determining one or more map constraints based, at least in part, on the passenger data and the map data, wherein the one or more map constraints are indicative of one or more restricted route segments of the plurality of route segments, wherein the one or more restricted route segments are associated with at least one passenger orientation restriction; and
generating a constrained route from the origin location to the destination location based, at least in part, on the one or more map constraints;
initiating a motion for an autonomous vehicle based, at least in part, on the constrained route.

16. The computing system of claim 15, wherein the one or more passenger attributes comprise at least one of an age, a seat preference, a susceptibility to motion sickness, a handicap, or luggage.

17. The computing system of claim 15, wherein the passenger data is obtained from the passenger in response to the request for the transportation service.

18. The computing system of claim 15, wherein the request for the transportation service comprises a requested comfort level, and wherein the constrained route is generated based, at least in part, on the requested comfort level.

19. The computing system of claim 15, wherein the one or more map constraints are indicative of one or more restricted route segments of the plurality of route segments, and wherein the constrained route comprises one or more unrestricted route segments.

20. A bidirectional autonomous vehicle comprising:
a vehicle computing system comprising:
one or more processors; and
one or more non-transitory computer-readable media that collectively store instructions that, when executed by the one or more processors, cause the system to perform operations, the operations comprising:
obtaining passenger data for at least one passenger of the bidirectional autonomous vehicle, wherein the passenger data is indicative of a passenger orientation associated with the at least one passenger;
obtaining map data indicative of one or more route attributes for one or more of a plurality of route segments, wherein the one or more route attributes comprise one or more passenger orientation restrictions for the at least one passenger;
determining one or more map constraints based, at least in part, on the passenger data and the map data, wherein the one or more map constraints are indicative of one or more restricted route segments of the plurality of route segments, wherein the one or more restricted route segments are associated with at least one passenger orientation restriction; and
initiating a constrained motion plan for the autonomous vehicle based, at least in part, on the one or more map constraints, wherein the constrained motion plan is based on one or more unrestricted route segments different than the restricted route segments.

* * * * *